(12) United States Patent
Van Nee

(10) Patent No.: US 8,718,169 B2
(45) Date of Patent: May 6, 2014

(54) USING A FIELD FORMAT ON A COMMUNICATION DEVICE

(75) Inventor: Didier Johannes Richard Van Nee, De Meern (NL)

(73) Assignee: QUALCOMM Incorporated, San Diego, CA (US)

( * ) Notice: Subject to any disclaimer, the term of this patent is extended or adjusted under 35 U.S.C. 154(b) by 255 days.

(21) Appl. No.: 13/160,343

(22) Filed: Jun. 14, 2011

(65) Prior Publication Data

US 2011/0305296 A1 Dec. 15, 2011

Related U.S. Application Data

(60) Provisional application No. 61/354,930, filed on Jun. 15, 2010.

(51) Int. Cl.
*H04B 7/02* (2006.01)

(52) U.S. Cl.
USPC ........... 375/267; 375/147; 375/347; 375/295; 375/316; 370/338; 370/311; 370/252

(58) Field of Classification Search
USPC .................... 375/295, 267; 370/338, 311, 252
See application file for complete search history.

(56) References Cited

U.S. PATENT DOCUMENTS

| | | | | |
|---|---|---|---|---|
| 7,145,971 B2 * | 12/2006 | Raleigh et al. | ................. | 375/347 |
| 2010/0260159 A1 | 10/2010 | Zhang et al. | | |
| 2011/0032875 A1 | 2/2011 | Erceg et al. | | |
| 2011/0110348 A1 | 5/2011 | Lee et al. | | |
| 2011/0188598 A1* | 8/2011 | Lee et al. | ....................... | 375/267 |
| 2011/0280232 A1* | 11/2011 | Wu et al. | ....................... | 370/338 |
| 2012/0314869 A1* | 12/2012 | Zhang et al. | .................. | 380/287 |

FOREIGN PATENT DOCUMENTS

WO WO2011031058 A2 3/2011

OTHER PUBLICATIONS

Ward, Lisa, 802.11ac Technology Introduction, Rhode & Schwarz White Paper, May 2011 pp. 1-24.
International Search Report and Written Opinion—PCT/US2011/040573—ISA/EPO—Oct. 5, 2011.
Robert Stacey, "Multi-band, multi-radio wireless LANs and PANs", Signals, Systems and Computers, 2009 Conference Record of the Forty-Third Asilomar Conference on, IEEE, Piscataway, NJ, USA, Nov. 1, 2009, pp. 317-320, XP031679607, ISBN: 978-1-4244-5825-7.
Ryuta Imashioya et al: "RTL design of 1.2Gbps MIMO WLAN system and its business aspect", Communications and Information Technology. 2009. ISCIT 2009. 9th International Symposium on, IEEE, Piscataway, NJ, USA, Sep. 28, 2009, pp. 296-301, XP031571317, ISBN: 978-1-4244-4521-9.
Taiwan Search Report—TW100120944—TIPO—Sep. 13, 2013.

\* cited by examiner

*Primary Examiner* — Eva Puente
(74) *Attorney, Agent, or Firm* — Eric Ho

(57) ABSTRACT

A communication device for transmitting a Very High Throughput Signal Field B (VHT-SIG-B) is described. The communication device includes a processor and instructions stored in memory that is in electronic communication with the processor. The communication device allocates at least twenty signal bits and six tail bits for the VHT-SIG-B. The communication device also uses a number of subcarriers for the VHT-SIG-B that is the same as a number of subcarriers for a Very High Throughput Long Training Field (VHT-LTF) and a DATA field. The communication device additionally applies a pilot mapping for the VHT-SIG-B that is the same as a pilot mapping for the DATA field. The communication device further transmits the VHT-SIG-B.

48 Claims, 11 Drawing Sheets

USING A FIELD FORMAT ON A COMMUNICATION DEVICE

RELATED APPLICATIONS

This application is related to and claims priority from U.S. Provisional Patent Application Ser. No. 61/354,930 filed Jun. 15, 2010, for "FORMAT OF VHT-SIG-B IN 802.11AC STANDARD."

TECHNICAL FIELD

The present disclosure relates generally to communication systems. More specifically, the present disclosure relates to using a field format on a communication device.

BACKGROUND

Communication systems are widely deployed to provide various types of communication content such as data, voice, video and so on. These systems may be multiple-access systems capable of supporting simultaneous communication of multiple communication devices (e.g., wireless communication devices, access terminals, etc.) with one or more other communication devices (e.g., base stations, access points, etc.).

Use of communication devices has dramatically increased over the past few years. Communication devices often provide access to a network, such as a Local Area Network (LAN) or the Internet, for example. Other communication devices (e.g., access terminals, laptop computers, smart phones, media players, gaming devices, etc.) may wirelessly communicate with communication devices that provide network access. Some communication devices comply with certain industry standards, such as the Institute of Electrical and Electronics Engineers (IEEE) 802.11 (e.g., Wireless Fidelity or "Wi-Fi") standards. Communication device users, for example, often connect to wireless networks using such communication devices.

As the use of communication devices has increased, advancements in communication device capacity, reliability and efficiency are being sought. Systems and methods that improve communication device capacity, reliability and/or efficiency may be beneficial.

SUMMARY

A communication device for transmitting a Very High Throughput Signal Field B (VHT-SIG-B) is disclosed. The communication device includes a processor and instructions stored in memory that is in electronic communication with the processor. The communication device allocates at least twenty signal bits and six tail bits for a VHT-SIG-B. The communication device also uses a number of subcarriers for the VHT-SIG-B that is the same as a number of subcarriers for a Very High Throughput Long Training Field (VHT-LTF) and a DATA field. The communication device additionally applies a pilot mapping for the VHT-SIG-B that is the same as a pilot mapping for the DATA field. The communication device additionally transmits the VHT-SIG-B. The communication device may be an access point or an access terminal.

The communication device may allocate twenty signal bits and six tail bits for the VHT-SIG-B if a transmission bandwidth is 20 MHz. If a transmission bandwidth is 40 MHz, the communication device may allocate a set of twenty signal bits, one reserved bit and six tail bits for the VHT-SIG-B and repeat the set for the VHT-SIG-B. If a transmission bandwidth is 80 MHz, the communication device may allocate a set of twenty signal bits, three reserved bits and six tail bits for the VHT-SIG-B and repeat the set three times for the VHT-SIG-B. If a transmission bandwidth is 160 MHz, the communication device may allocate a group of bits including four copies of a set of twenty signal bits, three reserved bits and six tail bits for the VHT-SIG-B and repeat the group of bits for the VHT-SIG-B. The communication device may use a separate format for the VHT-SIG-B if a transmission bandwidth is 160 MHz.

The communication device may copy the VHT-SIG-B onto a number of space-time streams that is the same as a number of space-time streams in the DATA field for another communication device. The communication device may apply a guard interval to the VHT-SIG-B that is the same as a guard interval in a packet.

A communication device for receiving a Very High Throughput Signal Field B (VHT-SIG-B) is also disclosed. The communication device includes a processor and instructions stored in memory that is in electronic communication with the processor. The communication device receives a VHT-SIG-B on a number of space-time streams. The VHT-SIG-B includes at least twenty signal bits and six tail bits. The VHT-SIG-B has a number of subcarriers that is the same as a number of subcarriers for a Very High Throughput Long Training Field (VHT-LTF) and a DATA field. The VHT-SIG-B has a pilot mapping that is the same as a pilot mapping for the DATA field. The communication device decodes the VHT-SIG-B. The communication device may be an access point or an access terminal. The number of space-time streams may be the same as a number of space-time streams in the DATA field. The VHT-SIG-B may have a guard interval that is the same as a guard interval in a packet.

The VHT-SIG-B may include twenty signal bits and six tail bits for the VHT-SIG-B if a transmission bandwidth is 20 MHz. If a transmission bandwidth is 40 MHz, the VHT-SIG-B may include two sets of twenty signal bits, one reserved bit and six tail bits. If a transmission bandwidth is 80 MHz, the VHT-SIG-B may include four sets of twenty signal bits, three reserved bits and six tail bits. If a transmission bandwidth is 160 MHz, the VHT-SIG-B may include two groups of bits. Each group of bits may include four sets of twenty signal bits, three reserved bits and six tail bits. The VHT-SIG-B may have a separate format if a transmission bandwidth is 160 MHz.

Decoding the VHT-SIG-B may include adding channel estimates for the number of space-time streams and may include performing single-stream detection. Decoding the VHT-SIG-B may include performing Multiple Input and Multiple Output (MIMO) receive processing. Decoding the VHT-SIG-B may further include averaging the space-time streams and performing single-stream deinterleaving and decoding.

A method for transmitting a Very High Throughput Signal Field B (VHT-SIG-B) by a communication device is also disclosed. The method includes allocating at least twenty signal bits and six tail bits for a VHT-SIG-B. The method also includes using a number of subcarriers for the VHT-SIG-B that is the same as a number of subcarriers for a Very High Throughput Long Training Field (VHT-LTF) and a DATA field. The method further includes applying a pilot mapping for the VHT-SIG-B that is the same as a pilot mapping for the DATA field. The method additionally includes transmitting the VHT-SIG-B.

A method for receiving a Very High Throughput Signal Field B (VHT-SIG-B) by a communication device is also disclosed. The method includes receiving a VHT-SIG-B on a number of space-time streams. The VHT-SIG-B includes at least twenty signal bits and six tail bits. The VHT-SIG-B has a number of subcarriers that is the same as a number of subcarriers for a Very High Throughput Long Training Field (VHT-LTF) and a DATA field. The VHT-SIG-B has a pilot mapping that is the same as a pilot mapping for the DATA field. The method also includes decoding the VHT-SIG-B.

A computer-program product for transmitting a Very High Throughput Signal Field B (VHT-SIG-B) is also disclosed. The computer-program product includes a non-transitory tangible computer-readable medium with instructions. The instructions include code for causing a communication device to allocate at least twenty signal bits and six tail bits for a VHT-SIG-B. The instructions also include code for causing the communication device to use a number of subcarriers for the VHT-SIG-B that is the same as a number of subcarriers for a Very High Throughput Long Training Field (VHT-LTF) and a DATA field. The instructions further include code for causing the communication device to apply a pilot mapping for the VHT-SIG-B that is the same as a pilot mapping for the DATA field. The instructions additionally include code for causing the communication device to transmit the VHT-SIG-B.

A computer-program product for receiving a Very High Throughput Signal Field B (VHT-SIG-B) is also disclosed. The computer-program product includes a non-transitory tangible computer-readable medium with instructions. The instructions include code for causing a communication device to receive a VHT-SIG-B on a number of space-time streams. The VHT-SIG-B includes at least twenty signal bits and six tail bits. The VHT-SIG-B has a number of subcarriers that is the same as a number of subcarriers for a Very High Throughput Long Training Field (VHT-LTF) and a DATA field. The VHT-SIG-B has a pilot mapping that is the same as a pilot mapping for the DATA field. The instructions additionally include code for causing the communication device to decode the VHT-SIG-B.

An apparatus for transmitting a Very High Throughput Signal Field B (VHT-SIG-B) is also disclosed. The apparatus includes means for allocating at least twenty signal bits and six tail bits for a VHT-SIG-B. The apparatus also includes means for using a number of subcarriers for the VHT-SIG-B that is the same as a number of subcarriers for a Very High Throughput Long Training Field (VHT-LTF) and a DATA field. The apparatus further includes means for applying a pilot mapping for the VHT-SIG-B that is the same as a pilot mapping for the DATA field. The apparatus additionally includes means for transmitting the VHT-SIG-B.

An apparatus for receiving a Very High Throughput Signal Field B (VHT-SIG-B) is also disclosed. The apparatus includes means for receiving a VHT-SIG-B on a number of space-time streams. The VHT-SIG-B includes at least twenty signal bits and six tail bits. The VHT-SIG-B has a number of subcarriers that is the same as a number of subcarriers for a Very High Throughput Long Training Field (VHT-LTF) and a DATA field. The VHT-SIG-B has a pilot mapping that is the same as a pilot mapping for the DATA field. The apparatus additionally includes means for decoding the VHT-SIG-B.

DETAILED DESCRIPTION

Figure 1:
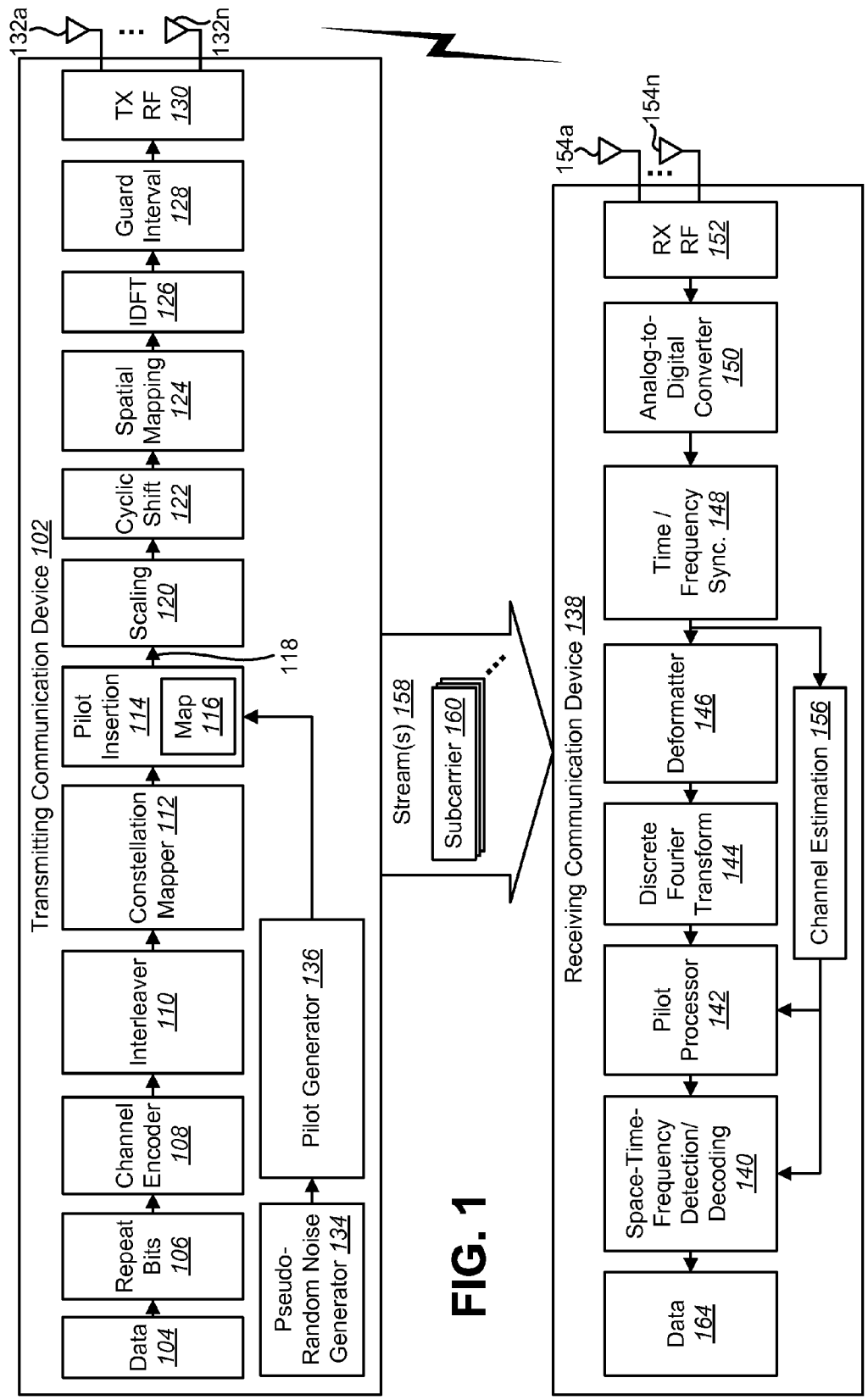
FIG. 1 is a block diagram illustrating one configuration of a transmitting communication device and a receiving communication device in which systems and methods for using a field format may be implemented.

Examples of communication devices include cellular telephone base stations or nodes, access points, wireless gateways and wireless routers. A communication device may operate in accordance with certain industry standards, such as the Institute of Electrical and Electronics Engineers (IEEE) 802.11a, 802.11b, 802.11g, 802.11n and/or 802.11ac (e.g., Wireless Fidelity or "Wi-Fi") standards. Other examples of standards that a communication device may comply with include IEEE 802.16 (e.g., Worldwide Interoperability for Microwave Access or "WiMAX"), Third Generation Partnership Project (3GPP), 3GPP Long Term Evolution (LTE) and others (e.g., where a communication device may be referred to as a Node B, evolved Node B (eNB), etc.). While some of the systems and methods disclosed herein may be described in terms of one or more standards, this should not limit the scope of the disclosure, as the systems and methods may be applicable to many systems and/or standards.

Some communication devices (e.g., access terminals, client devices, client stations, etc.) may wirelessly communicate with other communication devices. Some communication devices may be referred to as stations (STAs), mobile devices, mobile stations, subscriber stations, user equipments (UEs), remote stations, access terminals, mobile terminals, terminals, user terminals, subscriber units, etc. Additional examples of communication devices include laptop or desktop computers, cellular phones, smart phones, wireless modems, e-readers, tablet devices, gaming systems, etc. Some of these communication devices may operate in accordance with one or more industry standards as described above. Thus, the general term "communication device" may include communication devices described with varying nomenclatures according to industry standards (e.g., access terminal, user equipment (UE), remote terminal, access point, base station, Node B, evolved Node B (eNB), etc.).

Some communication devices may be capable of providing access to a communications network. Examples of communications networks include, but are not limited to, a telephone network (e.g., a "land-line" network such as the Public-Switched Telephone Network (PSTN) or cellular phone network), the Internet, a Local Area Network (LAN), a Wide Area Network (WAN), a Metropolitan Area Network (MAN), etc.

The IEEE 802.11 group's current work involves standardizing a new and faster version of 802.11, under the name VHT (Very High Throughput). This extension may be referred to as 802.11ac. The use of additional signal bandwidth (BW) is also being considered such as transmissions using 80 megahertz (MHz) and 160 MHz. Physical-layer (PHY) preambles may be defined that allow for both increased signal bandwidth and that allow backward compatibility to 802.11n, 802.11a, and 802.11.

An 802.11ac frame with a preamble may be structured including several fields. In one configuration, an 802.11ac frame may include a legacy short training field or non-high throughput short training field (L-STF), a legacy long training field or non-high throughput long training field (L-LTF), a legacy signal field or non-high throughput signal field (L-SIG), one or more very high throughput signal fields A (VHT-SIG-A), a very high throughput short training field (VHT-STF), one or more very high throughput long training fields (VHT-LTFs), a very high throughput signal field B (VHT-SIG-B) and a data field (e.g., DATA or VHT-DATA). In some configurations, multiple VHT-SIG-As may be used (e.g., a VHT-SIG-A1 and a VHT-SIG-A2).

The systems and methods disclosed herein describe a format for a very high throughput signal field B (VHT-SIG-B). The VHT-SIG-B may contain user-specific information (e.g., modulation and coding rate) and may be spatially multiplexed for different clients (e.g., receiving communication devices, wireless communication devices, etc.).

In IEEE 802.11, a communication device may send pilot symbols to another communication device. The pilot symbols may be sent using one or more spatial streams, for example. In one configuration, pilot symbols may be sent in a very high throughput signal field B (VHT-SIG-B). Pilot symbols may additional to or alternatively be sent in one or more fields (e.g., in a very high throughput data (VHT-DATA) field).

In accordance with the systems and methods disclosed, herein, the VHT-SIG-B may use the same pilot mapping as is used for DATA symbols. For example, a communication device may generate one or more pilot sequences to be mapped to subcarriers on one or more spatial streams. A pilot sequence may include one or more pilot symbols. In one configuration, a pilot sequence may comprise four pilot symbols (e.g., $\Psi_0$ to $\Psi_3$) per spatial stream when using a twenty megahertz (MHz) transmission bandwidth For a transmission bandwidth of 40 MHz, for example, a pilot sequence may comprise six pilot symbols (e.g., $\Psi_0$ to $\Psi_5$) per spatial stream. For a transmission bandwidth of 80 MHz, a pilot sequence may comprise eight pilot symbols (e.g., $\Psi_0$ to $\Psi_7$), for instance.

In one configuration (e.g., in IEEE 802.11ac), the pilot mapping on all $N_{STS}$ streams may be the same (except for possible different cyclic shift diversity values (CSDs) per stream, for example). As follows hereafter, an example of a pilot mapping for a 20 MHz transmission is given, followed by an example of a pilot mapping for a 40 MHz transmission. Then, an example of a pilot mapping for an 80 MHz transmission is given.

In one configuration, a pilot sequence for a VHT-SIG-B for a 20 MHz transmission may be applied as follows. The pilot tone mapping in a 20 MHz transmission is illustrated in Equation (1).

$$P_n^{\{-21,-7,7,21\}} = \{\Psi_{1,n\,mod\,4}^{(1)}, \Psi_{1,(n+1)mod\,4}^{(1)}, \Psi_{1,(n+2)mod\,4}^{(1)}, \Psi_{1,(n+3)mod\,4}^{(1)}\} \quad (1)$$

In Equation (1), $\Psi_{1,m}^{(1)}$ represents pilot symbols in the pilot sequence. In Equation (1), P is the pilot sequence and n is a symbol index (e.g., n=0 for a VHT-SIG-B). Including a pseudo-random scrambling sequence, the pilot value for the kth tone (with k={−21, −7, 7, 21}) is $p_{n+z}P_n^k$, where z=3 for the VHT-SIG-B and where $p_n$ is defined in Section 17.3.5.9 of IEEE 802.11 specifications.

In one configuration, a pilot sequence for a VHT-SIG-B for a 40 MHz transmission may be applied as follows. The pilot tone mapping in a 40 MHz transmission is illustrated in Equation (2).

$$P_n^{\{-53,-25,-11,11,25,53\}} = \{\Psi_{1,n\,mod\,6}^{(1)}, \Psi_{1,(n+1)mod\,6}^{(1)}, \Psi_{1,(n+2)mod\,6}^{(1)}, \ldots \Psi_{1,(n+3)mod\,6}^{(1)}, \Psi_{1,(n+4)mod\,6}^{(1)}, \Psi_{1,(n+5)mod\,6}^{(1)}\} \quad (2)$$

In Equation (2), $\Psi_{1,m}^{(1)}$ represents pilot symbols in the pilot sequence. In Equation (2), P is the pilot sequence and n is a symbol index (e.g., n=0 for a VHT-SIG-B). Including a pseudo-random scrambling sequence, the pilot value for the kth tone (with k={−53, −25, −11,11, 25, 53}) is $p_{n+z}P_n^k$, where z=3 for the VHT-SIG-B and where $p_n$ is defined in Section 17.3.5.9 of IEEE 802.11 specifications.

In one configuration, a pilot sequence for a VHT-SIG-B for an 80 MHz transmission may be applied as follows. The pilot tone mapping in an 80 MHz transmission is illustrated in Equation (3).

$$P_n^{\{-103,-75,-39,-11,11,39,75,103\}} = \{\Psi_{n\,mod\,8}, \Psi_{(n+1)mod\,8}, \Psi_{(n+2)mod\,8}, \Psi_{(n+3)mod\,8}, \ldots \Psi_{(n+4)mod\,8}, \Psi_{(n+5)mod\,8}, \Psi_{(n+6)mod\,8}, \Psi_{(n+7)mod\,8}\} \quad (3)$$

In Equation (3), $\Psi_{1,m}$ represents pilot symbols in the pilot sequence. In Equation (3), P is the pilot sequence and n is a symbol index (e.g., n=0 for a VHT-SIG-B). Including a pseudo-random scrambling sequence, the pilot value for the kth tone (with k={−103, −75, −39, −11, 11, 39, 75, 103}) is $P_{n+z}P_n^k$ where z=3 for the VHT-SIG-B and where $p_n$ is defined in Section 17.3.5.9 of IEEE 802.11 specifications. It should be noted that pilot sequences may have a rotation applied (e.g., subsequently applied).

Thus, a (VHT-DATA) symbol index n=0 for the VHT-SIG-B. This means, for example, that the first DATA symbol and VHT-SIG-B both use a DATA symbol number 0. As described above, the pilot scrambling sequence index may be z=3 for the VHT-SIG-B.

In accordance with the systems and method disclosed herein, the VHT-SIG-B may use a same number of subcarriers as a Very High Throughput Long Training Field (VHT-LTF) and the DATA field. In the VHT-SIG-B, the pilots and scaling may be done similarly to that for the DATA field. For example, scaling may be done such that average power is the same as that for data symbols. This may avoid issues with duplicating 802.11a tones (like the VHT-SIG-A, for example). However, power scaling may be different for the VHT-SIG-B than that for the VHT-SIG-A (similar to an 802.11n High Throughput (HT) duplicate, for example). For example the VHT-SIG-A may have a different number of subcarriers. Thus, the scaling factor may be slightly different to make the average power the same for VHT-SIG-A, VHT-SIG-B, and DATA symbols. Pilot mapping and pilot processing may be different than that for the VHT-SIG-A, since VHT-LTFs may have a different number of pilots and a different pilot mapping than the VHT-SIG-A.

In accordance with the systems and methods disclosed herein, there may be 26 bits available in a VHT-SIG-B in 20 MHz mode (e.g., with 20 MHz transmission bandwidth). For transmission bandwidths of 40, 80 and 160 MHz bits may be repeated, including tail bits. This may provide additional bits for bandwidth (e.g., greater than twenty reserved bits). This may also provide a way for a receiver to get processing gain by averaging repeated soft values at the decoder input. In one configuration, two copied 80 MHz VHT-SIG-B data symbols may be used with a transmission bandwidth of 160 MHz. Alternatively, a separate format for a 160 MHz bandwidth may be used if a separate 160 MHz interleaver is used.

In accordance with the systems and methods disclosed herein, the VHT-SIG-B may be duplicated on space-time streams. In one configuration, the VHT-SIG-B may be encoded and interleaved as a single-spatial stream symbol. A constellation mapper output of the VHT-SIG-B may be copied onto $N_{STS}$ streams, where $N_{STS}$ is a number of space-time streams in the DATA field for an intended receiver, device or user. The $N_{STS}$ space-time streams for the VHT-SIG-B may use the same cyclic shift diversity (CSD) values as used in a DATA field.

In accordance with the systems and methods disclosed herein, the VHT-SIG-B may use a long guard interval. The long guard interval may be used in order to keep the same guard interval in the entire preamble part of a packet or frame.

Another communication device (e.g., receiver) may receive the VHT-SIG-B. When decoding the VHT-SIG-B, an $N_{STS}$-stream channel estimate may be available, where $N_{STS}$ is a number of space-time streams for one particular receiver, device or user. In one configuration, receiver decoding may be done as follows. For each subcarrier and each receive antenna, the channel estimates for all $N_{STS}$ streams may be added. A single-stream detection may then be done using this modified channel estimate. Alternatively, receiver decoding may be done as follows. Multiple Input and Multiple Output (MIMO) receive processing may be performed. The $N_{STS}$ may then be averaged per subcarrier. Finally, single-stream deinterleaving and decoding may be performed.

In one configuration of the systems and methods disclosed herein, a number of orthogonal frequency-division multiplexing (OFDM) tones and a number of bits for a VHT-SIG-B may be used as follows. For 40 MHz, 80 MHz and 160 MHz bandwidths (for transmission and/or reception), a set of bits may be repeated to respectively obtain two, four and eight sets. In some configurations, this repetition may not be done on each 20 MHz sub-band. The repetition may be performed prior to encoding and interleaving. Because of the interleaving, for example, the first 27 bits may be spread across 20 MHz sub-bands. Thus, each 20 MHz may not carry the same 27 bits. Rather, the first 27 bits may be repeated to obtain two sets (e.g., copies) for 40 MHz. For 80 MHz, the first 29 bits may be repeated to obtain four sets or copies with one extra padding bit. For 160 MHz, the first 29 bits may be repeated to obtain eight sets or copies with two extra pad bits. It should be noted that although BPSK and ½ rate coding is used as an example herein, other modulation schemes and/or coding rates may be used in a accordance with the systems and methods herein, which may allow for different numbers of bits to be included in each symbol. Table (1) illustrates one example of a number of data tones and a number of bits per signal bandwidth that may be used for a VHT-SIG-B in accordance with the systems and methods disclosed herein.

TABLE 1

| VHT-SIG-B | Signal Bandwidth | | | |
|---|---|---|---|---|
| | 20 MHz | 40 MHz | 80 MHz | 160 MHz |
| Number of Tones | 56 | 114 | 242 | 484 |
| Number of Data Tones | 52 | 108 | 234 | 468 |
| Number of Bits per Set | 26 | 27 | 29 (+1 pad) | 29 (+2 pad) |

Various configurations are now described with reference to the Figures, where like reference numbers may indicate functionally similar elements. The systems and methods as generally described and illustrated in the Figures herein could be arranged and designed in a wide variety of different configurations. Thus, the following more detailed description of several configurations, as represented in the Figures, is not intended to limit scope, as claimed, but is merely representative of the systems and methods.

FIG. 1 is a block diagram illustrating one configuration of a transmitting communication device 102 and a receiving communication device 138 in which systems and methods for using a field format may be implemented. Examples of the transmitting communication device 102 may include access points, access terminals, base stations, user equipments (UEs), stations (STAs), etc. Examples of the receiving communication device 138 may include access points, access terminals, base stations, user equipments (UEs), stations (STAs), etc. The transmitting communication device 102 may include a repeat bits block/module 106, a channel encoder 108, an interleaver 110, a constellation mapper 112, a pilot insertion block/module 114, a scaling block/module 120, a cyclic shift block/module 122, a spatial mapping block/module 124, an Inverse Discrete Fourier Transform (IDFT) block/module 126, a guard interval block/module 128, a transmission (TX) radio frequency (RF) block/module 130, one or more antennas 132a-n, a pseudo-random noise generator 134 and/or a pilot generator 136.

It should be noted that one or more of the elements 106, 108, 110, 112, 114, 120, 122, 124, 126, 128, 130, 134, 136 included in the transmitting communication device 102 may be implemented in hardware, software or a combination of both. Furthermore, the term "block/module" may be used to indicate that a particular element may be implemented in hardware, software or a combination of both. It should also be noted that although some of the elements 106, 108, 110, 112, 114, 120, 122, 124, 126, 128, 130, 134, 136 may be illustrated as a single block, one or more of the elements 106, 108, 110, 112, 114, 120, 122, 124, 126, 128, 130, 134, 136 illustrated may comprise multiple parallel blocks/modules in some configurations. For instance, multiple channel encoders 108, multiple interleavers 110, multiple constellation mappers 112, multiple pilot insertion blocks/modules 114, multiple scaling blocks/modules 120, multiple cyclic shift blocks/modules 122, multiple spatial mapping blocks/modules 124, multiple IDFT blocks/modules 126, multiple guard interval blocks/modules 128 and/or multiple TX RF blocks/modules 130 may be used to form multiple paths in some configurations.

For instance, separate streams 158 (e.g., space-time streams 158, spatial streams 158, etc.) may be generated and/or transmitted using separate paths. In some implementations, these paths are implemented with distinct hardware, whereas in other implementations, the path hardware is reused for more than one stream 158 or the path logic is implemented in software that executes for one or more streams 158. More specifically, each of the elements illustrated in the transmitting communication device 102 may be implemented as a single block/module or as multiple blocks/modules.

The data 104 may comprise overhead (e.g., control) data and/or payload data. For example, payload data may include voice, video, audio and/or other data. Overhead data may include control information, such as information that specifies a data rate, modulation and coding scheme (MCS), channel bandwidth, etc.

In some configurations or instances, the data 104 may be provided to the repeat bits block/module 106, which may repeat (e.g., generate copies of) bits from the data 104. For instance, if 40 MHz, 80 MHz or 160 MHz is used for a transmission bandwidth, then the repeat bits block/module 106 may repeat signal bits, tail bits and/or reserved bits for a Very High Throughput Signal Field B (VHT-SIG-B). For instance, if 40 MHz is used, then twenty signal bits, one reserved bit and six tail bits may be allocated and may be repeated once (resulting in two sets or copies of twenty signal bits, one reserved bit and six tail bits). If 80 MHz is used, then twenty signal bits, three reserved bits and six tail bits may be allocated and may be repeated three times (resulting in four sets or copies of twenty signal bits, three reserved bits and six tail bits). If 160 MHz is used, then twenty signal bits, three reserved bits and six tail bits may be allocated and may be repeated three times to form a group of bits for an 80 MHz signal (a group including four copies of the twenty signal bits, three reserved bits and six tail bits, for example), which may then be repeated or copied. This may result, for instance, in two groups of bits, each group including four sets of twenty signal bits, three reserved bits and six tail bits. For example, two copies of an 80 MHz VHT-SIG-B data symbol may be used for 160 MHz. Alternatively, a separate or different format may be used for 160 MHz (if a separate 160 MHz interleaver 110 is used).

The (optionally repeated) data 104 may be provided to the channel encoder 108. The channel encoder 108 may encode data 104 for forward error correction (FEC), encryption, packeting and/or other encodings known for use with wireless transmission. For example, the channel encoder 108 may use binary convolutional coding (BCC).

The encoded data may be provided to the interleaver 110. The interleaver 110 may change bit ordering or interleave bits in order to more evenly spread channel errors over a sequence of bits. The interleaved bits may be provided to the constellation mapper 112. In some configurations, a separate interleaver 110 for 160 MHz signals may be provided.

The constellation mapper 112 maps the data provided by the interleaver 110 into constellation points (e.g., complex numbers). For instance, the constellation mapper 112 may use modulation schemes such as binary phase-shift keying (BPSK), quadrature amplitude modulation (QAM), etc. Where quadrature-amplitude modulation (QAM) is used, for example, the constellation mapper 112 might provide two bits per stream 158, per subcarrier 160, per symbol period. Furthermore, the constellation mapper 112 may output a 16-QAM constellation signal for each stream 158 for each data subcarrier 160 for each symbol period. Other modulations may be used, such as 64-QAM, which would result in a consumption of six bits per stream 158, per data subcarrier 160, per symbol period. Other variations are also possible. In one configuration, BPSK modulation may be used for the VHT-SIG-B. It should be noted that the constellation mapper 112 may allocate a number of subcarriers (e.g., OFDM tones) 160 and map the constellation points (e.g., symbols) to the subcarriers 160.

The pilot generator 136 may generate a pilot sequence. A pilot sequence may be a group of pilot symbols. In one configuration, for instance, the values in the pilot sequence may be represented by a signal with a particular phase, amplitude and/or frequency. For example, a "1" may denote a pilot symbol with a particular phase and/or amplitude, while a "−1" may denote a pilot symbol with a different (e.g., opposite or inverse) phase and/or amplitude.

The transmitting communication device 102 may include a pseudo-random noise generator 134 in some configurations. The pseudo-random noise generator 134 may generate a pseudo-random noise sequence or signal (e.g., values) used to scramble the pilot sequence. For example, the pilot sequence for successive OFDM symbols may be multiplied by successive numbers from the pseudo-random noise sequence, thereby scrambling the pilot sequence per OFDM symbol. This may be done in accordance with the equation $p_{n+z}P_n^k$ where $p_n$ is the pseudo-random noise sequence, $P_n^k$ is the pilot sequence (or pilot mapping matrix), and k is an OFDM tone (e.g., subcarrier 160) index. In one configuration, n=0 and z=3 for the VHT-SIG-B. When the pilot sequence is sent to a receiving communication device 138, the received pilot sequence may be unscrambled by a pilot processor 142. It should be noted that the VHT-DATA symbol n=0 may be used for the VHT-SIG-B, meaning that the first DATA symbol and the VHT-SIG-B may both use DATA symbol number 0. It should also be noted that the pilot scrambling sequence z=3 may be used for the VHT-SIG-B.

The pilot insertion block/module 114 inserts pilot tones into pilot tone subcarriers 160. For example, the pilot sequence may be mapped to subcarriers 160 at particular indices according to a map 116. For instance, pilot symbols from the (scrambled) pilot sequence may be mapped to pilot subcarriers 160 that are interspersed with data subcarriers 160 and/or other subcarriers 160. In other words, the pilot sequence or signal may be combined with the data sequence or signal. In some configurations, one or more direct current (DC) tones may be centered at a subcarrier index 0.

The pilot mapping performed for a VHT-SIG-B by the pilot insertion block/module 114 may be the same as the pilot mapping performed for a DATA field in a packet or frame. As described above, the pilot symbols may be inserted at subcarrier indices {−21, −7, 7, 21} if a 20 MHz bandwidth is used. Additionally or alternatively, the pilot symbols may be inserted at subcarrier indices {−53, −25, −11, 11, 25, 53} if a 40 MHz bandwidth is used. Additionally or alternatively, the pilot symbols may be inserted at subcarrier indices {−103, −75, −39, −11, 11, 39, 75, 103} if an 80 MHz bandwidth is used. For a 160 MHz bandwidth, the indices used for an 80 MHz bandwidth may be used in two 80 MHz bandwidths, for example. In some configurations, the number of subcarriers used for the VHT-SIG-B may be the same as the number of subcarriers used for the VHT-LTF(s) and the DATA field(s). This may be the case for 802.11ac. It should be noted that although examples of subcarrier or tone index numbers are given, other subcarrier or tone index numbers may be used.

The combined data and pilot signal 118 may be provided to a scaling block/module 120. The scaling block/module 120 may scale pilot symbols and/or data symbols. In some configurations, the scaling block/module 120 scales the pilot symbols and/or data symbols for the VHT-SIG-B in the same way as for a DATA field. In one configuration, scaling may be performed by multiplying symbol values by a scaling value. This may be similar to the procedure followed in the 802.11n specification.

The scaled signal (e.g., the output signal from the scaling block/module 120) may be provided to the cyclic shift block/module 122. The cyclic shift block/module 122 may insert cyclic shifts to one or more spatial streams or space-time streams for cyclic shift diversity (CSD). In one configuration, the $N_{STS}$ space-time streams for the VHT-SIG-B may use the same CSD values as are used for a DATA field.

In one configuration, the VHT-SIG-B may be encoded (by the channel encoder 108) and interleaved (by the interleaver 110) as a single-spatial-stream symbol. The constellation mapper 112 output (or the output of the pilot insertion block/module 114, the output of the scaling block/module 120 or the output of the cyclic shift block/module 122) of the VHT-SIG-B may be copied onto $N_{STS}$ streams 158, where $N_{STS}$ is a number of space-time streams 158 in a DATA field for an intended receiving communication device 138 or user. For example, the spatial mapping block/module 124 may map the VHT-SIG-B to $N_{STS}$ space-time streams 158 or spatial streams 158.

The IDFT block/module 126 may perform an inverse discrete Fourier transform on the signal provided by the spatial mapping block/module 124. For example, the inverse discrete Fourier transform (IDFT) block/module 126 converts the frequency signals of the data 104 and inserted pilot tones into time domain signals representing the signal over the streams 158 and/or time-domain samples for a symbol period. In one configuration, for example, the IDFT block/module 126 may perform a 256-point inverse fast Fourier transform (IFFT). In some configurations, the IDFT block/module 126 may additionally apply a phase rotation to one or more 20 MHz sub-bands.

The signal output from the IDFT block/module 126 may be provided to the guard interval block/module 128. The guard interval block/module 128 may insert (e.g., prepend) a guard interval to the signal output from the IDFT block/module 126. For example, the guard interval block/module 128 may insert a long guard interval that is the same length as a guard interval for other fields in a frame preamble. In some configurations, the guard interval block/module 128 may additionally perform windowing on the signal.

The output of the guard interval block/module 128 may be provided to the transmission (TX) radio frequency (RF) block/module 130. The TX RF block/module 130 may upconvert the output of the guard interval block/module 128 (e.g., a complex baseband waveform) and transmit the resulting signal using the one or more antennas 132a-n. For example, the one or more TX RF blocks/modules 130 may output radio-frequency (RF) signals to one or more antennas 132a-n, thereby transmitting the data 104 that was input to the channel encoder 108 over a wireless medium suitably configured for receipt by one or more receiving communication devices 138.

It should be noted that the transmitting communication device 102 may determine channel bandwidth to be used for transmissions to one or more receiving communication devices 138. This determination may be based on one or more factors, such as receiving communication device 138 compatibility, number of receiving communication devices 138 (to use the communication channel), channel quality (e.g., channel noise) and/or a received indicator, etc. In one configuration, the transmitting communication device 102 may determine whether the bandwidth for signal transmission is 20 MHz, 40 MHz, 80 MHz or 160 MHz.

One or more of the elements 106, 108, 110, 112, 114, 120, 122, 124, 126, 128, 130, 134, 136 included in the transmitting communication device 102 may operate based on the bandwidth determination. For example, the repeat bits block/module 106 may (or may not) repeat bits based on the bandwidth for signal transmission. Additionally, the pilot generator 136 may generate a number of pilot tones based on the bandwidth for signal transmission. For example, the pilot generator 136 may generate eight pilot symbols for an 80 MHz signal (with 242 OFDM tones: 234 data tones and eight pilot tones with three DC subcarriers 160).

Additionally, the constellation mapper 112 may map data 104 to a number of OFDM tones and the pilot insertion block/module 114 may insert pilot tones based on the bandwidth for signal transmission. In one example, if the current field is a VHT-SIG-B and the bandwidth used is 80 MHz, the constellation mapper 112 may map data 104 to 234 OFDM tones or subcarriers 160, leaving eight OFDM tones (e.g., subcarriers 160) for pilots and three subcarriers 160 as DC tones. In some configurations, the constellation mapper 112 may use a look-up table to determine the number of tones or subcarriers to use for a specified bandwidth.

Additionally, the pilot insertion block/module 114 may insert pilots based on the transmission bandwidth. For instance, an 80 MHz bandwidth may indicate that the pilot symbols should be inserted at indices −103, −75, −39, −11, 11, 39, 75 and 103. It should be noted that the IDFT block/module 126 may additionally rotate sub-bands (e.g., 20 MHz sub-bands) based on the bandwidth for signal transmission.

In one configuration, if the determined bandwidth is 20 MHz, the transmitting communication device 102 may allocate 56 OFDM tones for the VHT-SIG-B field and/or 56 for the DATA field. If the bandwidth determined is 40 MHz, the transmitting communication device 102 may allocate 114 OFDM tones for the VHT-SIG-B and/or 114 for the DATA field. If the bandwidth is 80 MHz, the transmitting communication device 102 may allocate 242 OFDM tones for the VHT-SIG-B and/or 242 for the DATA field. If the bandwidth is 160 MHz, the transmitting communication device 102 may allocate 484 OFDM tones for the VHT-SIG-B and/or 484 for the DATA field. Other numbers of OFDM tones may be used.

One or more streams 158 may be transmitted from the transmitting communication device 102 such that the transmissions on different streams 158 may be differentiable at a receiving communication device 138 (with some probability). For example, bits mapped to one spatial dimension are transmitted as one stream 158. That stream 158 might be transmitted on its own antenna 132 spatially separate from other antennas 132, its own orthogonal superposition over a plurality of spatially-separated antennas 132, its own polarization, etc. Many techniques for stream 158 separation (involving separating antennas 132 in space or other techniques that would allow their signals to be distinguished at a receiver, for example) are known and can be used.

In the example shown in FIG. 1, there are one or more streams 158 that are transmitted using the same or a different number of antennas 132a-n (e.g., one or more). In some instances, only one stream 158 might be available because of inactivation of one or more other streams 158.

In the case that the transmitting communication device 102 uses a plurality of frequency subcarriers 160, there are multiple values for the frequency dimension, such that the constellation mapper 112 might map some bits to one frequency subcarrier 160 and other bits to another frequency subcarrier 160. Other frequency subcarriers 160 may be reserved as guard bands, pilot tone subcarriers, or the like that do not (or do not always) carry data 104. For example, there may be one or more data subcarriers 160 and one or more pilot subcarriers 160. It should be noted that, in some instances or configurations, not all subcarriers 160 may be excited at once. For instance, some tones may not be excited to enable filtering. In one configuration, the transmitting communication device 102 may utilize orthogonal frequency-division multiplexing (OFDM) for the transmission of multiple subcarriers 160. For instance, the constellation mapper 112 may map (encoded) data 104 to time and/or frequency resources according to the multiplexing scheme used.

The time dimension refers to symbol periods. Different bits may be allocated to different symbol periods. Where there are multiple streams 158, multiple subcarriers 160 and multiple symbol periods, the transmission for one symbol period might be referred to as an "OFDM (orthogonal frequency-division multiplexing) MIMO (multiple-input, multiple-output) symbol." A transmission rate for encoded data may be determined by multiplying the number of bits per simple symbol (e.g., $\log_2$ of the number of constellations used) times the number of streams 158 times the number of data subcarriers 160, divided by the length of the symbol period.

One or more receiving communication devices 138 may receive and use signals from the transmitting communication device 102. For example, a receiving communication device 138 may use a received bandwidth indicator to receive a given number of OFDM tones or subcarriers 160. Additionally or alternatively, a receiving communication device 138 may use a pilot sequence generated by the transmitting communication device 102 to characterize the channel, transmitter impairments and/or receiver impairments and use that characterization to improve receipt of data 104 encoded in the transmissions.

For example, a receiving communication device 138 may include one or more antennas 154a-n (which may be greater than, less than or equal to the number of transmitting communication device 102 antennas 132a-n and/or the number of streams 158) that feed to one or more receiver radio-frequency (RX RF) blocks/modules 152. The one or more RX RF blocks/modules 152 may output analog signals to one or more analog-to-digital converters (ADCs) 150. For example, a receiver radio-frequency block 152 may receive and down-convert a signal, which may be provided to an analog-to-digital converter 150. As with the transmitting communication device 102, the number of streams 158 processed may or may not be equal to the number of antennas 154a-n. Furthermore, each spatial stream 158 need not be limited to one antenna 154, as various beamsteering, orthogonalization, etc. techniques may be used to arrive at a plurality of receiver streams.

The one or more analog-to-digital converters (ADCs) 150 may convert the received analog signal(s) to one or more digital signal(s). The output(s) of the one or more analog-to-digital converters (ADCs) 150 may be provided to one or more time and/or frequency synchronization blocks/modules 148. A time and/or frequency synchronization block/module 148 may (attempt to) synchronize or align the digital signal in time and/or frequency (to a receiving communication device 138 clock, for example).

The (synchronized) output of the time and/or frequency synchronization block(s)/module(s) 148 may be provided to one or more deformatters 146. For example, a deformatter 146 may receive an output of the time and/or frequency synchronization block(s)/module(s) 148, remove guard intervals, etc. and/or parallelize the data for discrete Fourier transform (DFT) processing.

One or more deformatter 146 outputs may be provided to one or more discrete Fourier transform (DFT) blocks/modules 144. The discrete Fourier transform (DFT) blocks/modules 144 may convert one or more signals from the time domain to the frequency domain. A pilot processor 142 may use the frequency domain signals (per spatial stream 158, for example) to determine one or more pilot tones (over the streams 158, frequency subcarriers 160 and/or groups of symbol periods, for example) sent by the transmitting communication device 102. The pilot processor 142 may additionally or alternatively de-scramble the pilot sequence. The pilot processor 142 may use the one or more pilot sequences described herein for phase and/or frequency and/or amplitude tracking. The pilot tone(s) may be provided to a space-time-frequency detection and/or decoding block/module 140, which may detect and/or decode the data over the various dimensions. The space-time-frequency detection and/or decoding block/module 140 may output received data 164 (e.g., the receiving communication device's 138 estimation of the data 104 transmitted by the transmitting communication device 102).

In some configurations, the receiving communication device 138 knows the transmit sequences sent as part of a total information sequence. The receiving communication device 138 may perform channel estimation with the aid of these known transmit sequences. To assist with pilot tone tracking, processing and/or data detection and decoding, a channel estimation block/module 156 may provide estimation signals to the pilot processor 142 and/or the space-time-frequency detection and/or decoding block/module 140 based on the output from the time and/or frequency synchronization block/module 148. Alternatively, if the de-formatting and discrete Fourier transform is the same for the known transmit sequences as for the payload data portion of the total information sequence, the estimation signals may be provided to the pilot processor 142 and/or the space-time-frequency detection and/or decoding block/module 140 based on the output from the discrete Fourier transform (DFT) blocks/modules 144.

The receiving communication device 138 may receive the VHT-SIG-B. When decoding the VHT-SIG-B, an $N_{STS}$-stream channel estimate may be available (e.g., provided by the channel estimation block/module 156), where $N_{STS}$ is a number of space-time streams for one particular receiving communication device 138 or user. In one configuration, the space-time-frequency detection/decoding block/module 140 may function as follows. For each subcarrier 160 and each receive antenna 154a-n, the channel estimates for all $N_{STS}$ streams 158 may be added. The space-time-frequency detection/decoding block/module 140 may then perform a single-stream detection using this modified channel estimate. Alternatively, receiver decoding may be done as follows. The space-time-frequency detection/decoding block/module 140 may perform Multiple Input and Multiple Output (MIMO) receive processing. The $N_{STS}$ streams 158 may then be averaged per subcarrier 160. Finally, single-stream deinterleaving and decoding may be performed.

In some configurations, the receiving communication device 138 may determine a channel bandwidth (for received communications, which may also be referred to as a transmission bandwidth). For example, the receiving communication device 138 may receive a bandwidth indication from the transmitting communication device 102 that indicates a channel bandwidth. For instance, the receiving communication device 138 may obtain an explicit or implicit bandwidth indication. In one configuration, the bandwidth indication may indicate a channel bandwidth of 20 MHz, 40 MHz, 80 MHz or 160 MHz. The receiving communication device 138 may determine the bandwidth for received communications based on this indication and provide an indication of the determined bandwidth to the pilot processor 142 and/or to the space-time-frequency detection/decoding block/module 140.

In some configurations, if the determined bandwidth is 20 MHz, the receiving communication device 138 may receive 56 OFDM tones for the VHT-SIG-B and/or 56 for the DATA field. If the bandwidth determined is 40 MHz, the receiving communication device 138 may receive 114 OFDM tones for the VHT-SIG-B field and/or 114 for the DATA field. If the bandwidth is 80 MHz, the receiving communication device 138 may receive 242 OFDM tones for the VHT-SIG-B field and/or 242 for the DATA field. If the bandwidth is 160 MHz, the receiving communication device 138 may receive 484 OFDM tones for the VHT-SIG-B and/or 484 for the DATA field. Other numbers of OFDM tones may be received.

The pilot processor 142 may use the determined bandwidth indication to extract pilot symbols from the discrete Fourier transform block/module 144 output. For example, if the receiving communication device 138 detects that the bandwidth is 80 MHz, the pilot processor 142 may extract pilot symbols from the indices −103, −75, −39, −11, 11, 39, 75 and 103.

The space-time frequency detection/decoding block/module 140 may use the determined bandwidth indication to detect and/or decode data from the received signal. For example, if the current field is a VHT-SIG-B field and the determined bandwidth indication specifies that the bandwidth is 80 MHz, then the space-time frequency detection/decoding block/module 140 may detect and/or decode preamble data from 234 OFDM tones or subcarriers 160 (while eight OFDM tones are pilot tones and three subcarriers 160 are used for DC tones, for instance). In some configurations, the space-time-frequency detection/decoding block/module 140 may use a look-up table to determine the number of tones or subcarriers 160 to receive for a specified bandwidth.

Figure 2:
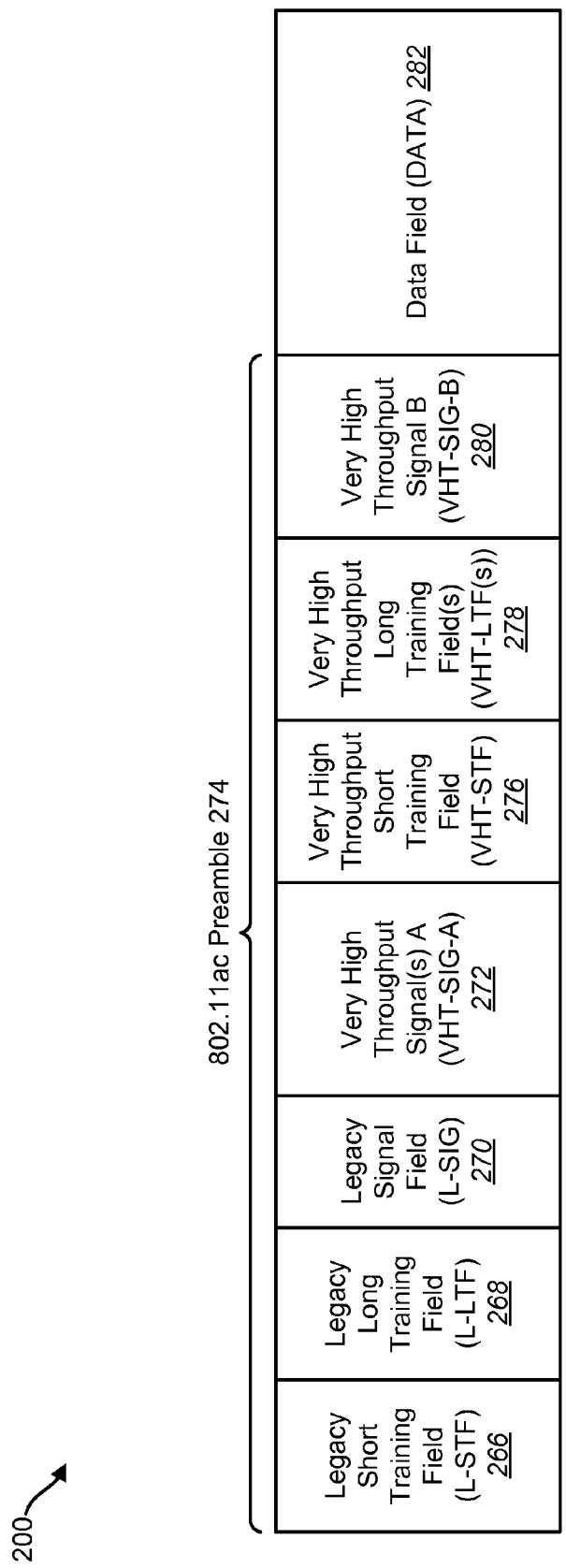
FIG. 2 is a diagram illustrating one example of a communication frame that may be used in accordance with the systems and methods disclosed herein.

FIG. 2 is a diagram illustrating one example of a communication frame 200 that may be used in accordance with the systems and methods disclosed herein. The frame 200 may include one or more sections or fields for preamble symbols, pilot symbols and/or data symbols. For example, the frame 200 may comprise an 802.11ac preamble 274 and a data field 282 (e.g., DATA or VHT-DATA field). In one configuration, the 802.11ac preamble 274 may have a duration of 40 to 68 μs. The preamble 274 and/or pilot symbols may be used (by a receiving communication device 138, for example) to synchronize, detect, demodulate and/or decode data included in the frame 200.

The frame 200 with an 802.11ac preamble 274 may be structured including several fields. In one configuration, an 802.11ac frame 200 may include a legacy short training field or non-high throughput short training field (L-STF) 266, a legacy long training field or non-high throughput long training field (L-LTF) 268, a legacy signal field or non-high throughput signal field (L-SIG) 270, one or more very high throughput signal symbols or fields A (VHT-SIG-A) 272 (e.g., VHT-SIG-A1, VHT-SIG-A2, etc.), a very high throughput short training field (VHT-STF) 276, one or more very high throughput long training fields (VHT-LTFs) 278, a very high throughput signal field B (VHT-SIG-B) 280 and a data field (DATA) 282.

The 802.11ac preamble 274 may accommodate backwards compatibility (with earlier 802.11 specifications, for instance). The first part of the preamble 274 may include the L-STF 266, L-LTF 268, L-SIG 270 and VHT-SIG-A 272. This first part of the preamble 274 may be decodable by legacy devices (e.g., devices that comply with legacy or earlier specifications).

A second part of the preamble 274 includes the VHT-STF 276, one or more VHT-LTFs 278, and the VHT-SIG-B 280. The second part of the preamble 274 may not be decodable by legacy devices (or even by all 802.11ac devices).

The 802.11ac preamble 274 may include some control data that is decodable by legacy 802.11a and 802.11n receivers. This control data may be contained in the L-SIG 270. The data in the L-SIG 270 informs all receivers how long the transmission will occupy the wireless medium, so that all devices may defer their transmissions for an accurate amount of time. Additionally, the 802.11ac preamble 274 allows 802.11ac devices to distinguish the transmission as an 802.11ac transmission (and avoid determining that the transmission is in an 802.11a or 802.11n format).

In accordance with the systems and methods disclosed herein, a number of data and pilot tones for an 80 MHz 802.11ac signal may be used. This may be compared to the number of data and pilot tones for 20 MHz 802.11n and 40 MHz 802.11n signals. A 20 MHz 802.11n signal uses 56 tones (52 data, four pilots) with one direct current (DC) tone. A 40 MHz 802.11n signal uses 114 tones (108 data, six pilots) with three DC tones. In one configuration of the systems and methods disclosed herein, 242 tones (e.g., 234 data tones and eight pilot tones) may be used with three DC tones for an 80 MHz 802.11ac signal.

One example of a tone allocation that may be used is illustrated in Table (2). More specifically, Table (2) illustrates numbers of OFDM tones (e.g., subcarriers) that may be utilized for an 802.11ac transmission for various signal bandwidths.

TABLE 2

| Field | Signal Bandwidth | | | |
| --- | --- | --- | --- | --- |
| | 20 MHz | 40 MHz | 80 MHz | 160 MHz |
| L-STF | 12 | 24 | 48 | 48 |
| L-LTF | 52 | 104 | 208 | 416 |
| L-SIG | 52 | 104 | 208 | 416 |
| VHT-SIG-A1 | 52 | 104 | 208 | 416 |
| VHT-SIG-A2 | 52 | 104 | 208 | 416 |
| VHT-STF | 12 | 24 | 48 | 48 |
| VHT-LTFs | 56 | 114 | 242 | 484 |
| VHT-SIG-B | 56 | 114 | 242 | 484 |
| DATA | 56 | 114 | 242 | 484 |

The one or more VHT-LTFs 278, the VHT-SIG-B field 280 and the DATA field 282 may utilize more OFDM tones than the first portion of the preamble 274. Each of these fields 278, 280 may utilize the same number of tones as the DATA field 282. For 20 MHz and 40 MHz 802.11ac transmissions, the number of tones may be chosen to match the 802.11n standard. For 80 MHz and 160 MHz 802.11ac transmissions, the number of tones may be chosen to be 242 and 484, respectively.

For a 20 MHz 802.11ac transmission, the VHT-SIG-B field 280 carries 26 bits of data if BPSK and ½ rate coding is used, for example. For a 40 MHz 802.11ac transmission, the VHT-SIG-B field 280 may carry either 54 bits of unique data or two copies or sets of 27 bits of data, for example. An 80 MHz transmission of the VHT-SIG-B field 280 may carry four copies or sets of 29 bits of data, two copies or sets of 58 bits of data or 117 bits of data, for example. A similar selection may be made for a 160 MHz transmission. For instance, a 160 MHz transmission may use two copies of 80 MHz VHT-SIG-B bits, may use eight copies (of the 29 bits of data) or may use a separate format.

Figure 3:
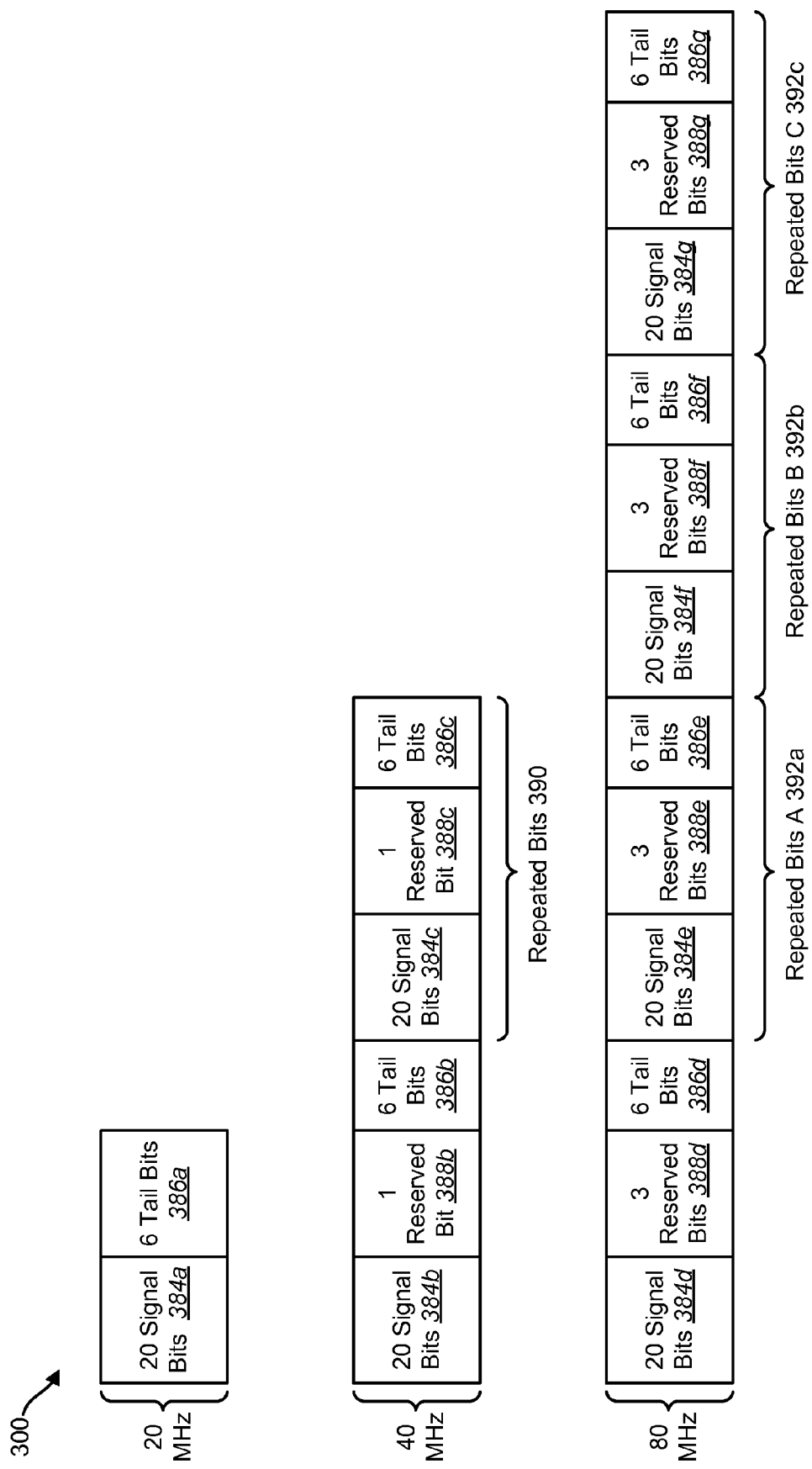
FIG. 3 is a diagram illustrating examples of Very High Throughput Signal Field Bs (VHT-SIG-Bs)

FIG. 3 is a diagram illustrating examples of VHT-SIG-Bs 300. In particular, FIG. 3 illustrates an example of a VHT-SIG-B for a 20 MHz transmission, an example of a VHT-SIG-B for a 40 MHz transmission and an example of a VHT-SIG-B for an 80 MHz transmission.

In the configuration illustrated in FIG. 3, the VHT-SIG-B may include twenty signal bits 384a and six tail bits 386a for a 20 MHz transmission. The VHT-SIG-B may include twenty signal bits 384b, one reserved bit 388b and six tail bits 386b as well as one set of repeated bits 390 for a 40 MHz transmission (resulting in two sets or copies). In this case, the set of repeated bits 390 may include twenty signal bits 384c, one reserved bit 388c and six tail bits 386c.

The VHT-SIG-B may include twenty signal bits 384d, three reserved bits 388d and six tail bits 386d as well as three sets of repeated bits 392a-c for an 80 MHz transmission (resulting in four sets or copies). In this case, repeated bits A 392a may include twenty signal bits 384e, three reserved bits 388e and six tail bits 386e. Furthermore, repeated bits B 392b may include twenty signal bits 384f, three reserved bits 388f and six tail bits 386f. Additionally, repeated bits C 392c may include twenty signal bits 384g, three reserved bits 388g and six tail bits 386g.

It should be noted that the signal bits 384 may include a packet length indication (e.g., a four-byte word length indication may be used in 802.11ac), modulation and coding scheme information and cyclic redundancy check (CRC) information. Tail bits 386 may be zero input bits that bring a convolutional encoder back into a known zero state. Reserved bits 388 may be bits that do not signal any function yet, but may be used in the future (e.g., in future standard updates). In one configuration, the bits illustrated for an 80 MHz transmission may be repeated for a 160 MHz transmission (resulting in two groups of bits as illustrated for the 80 MHz transmission).

Figure 4:
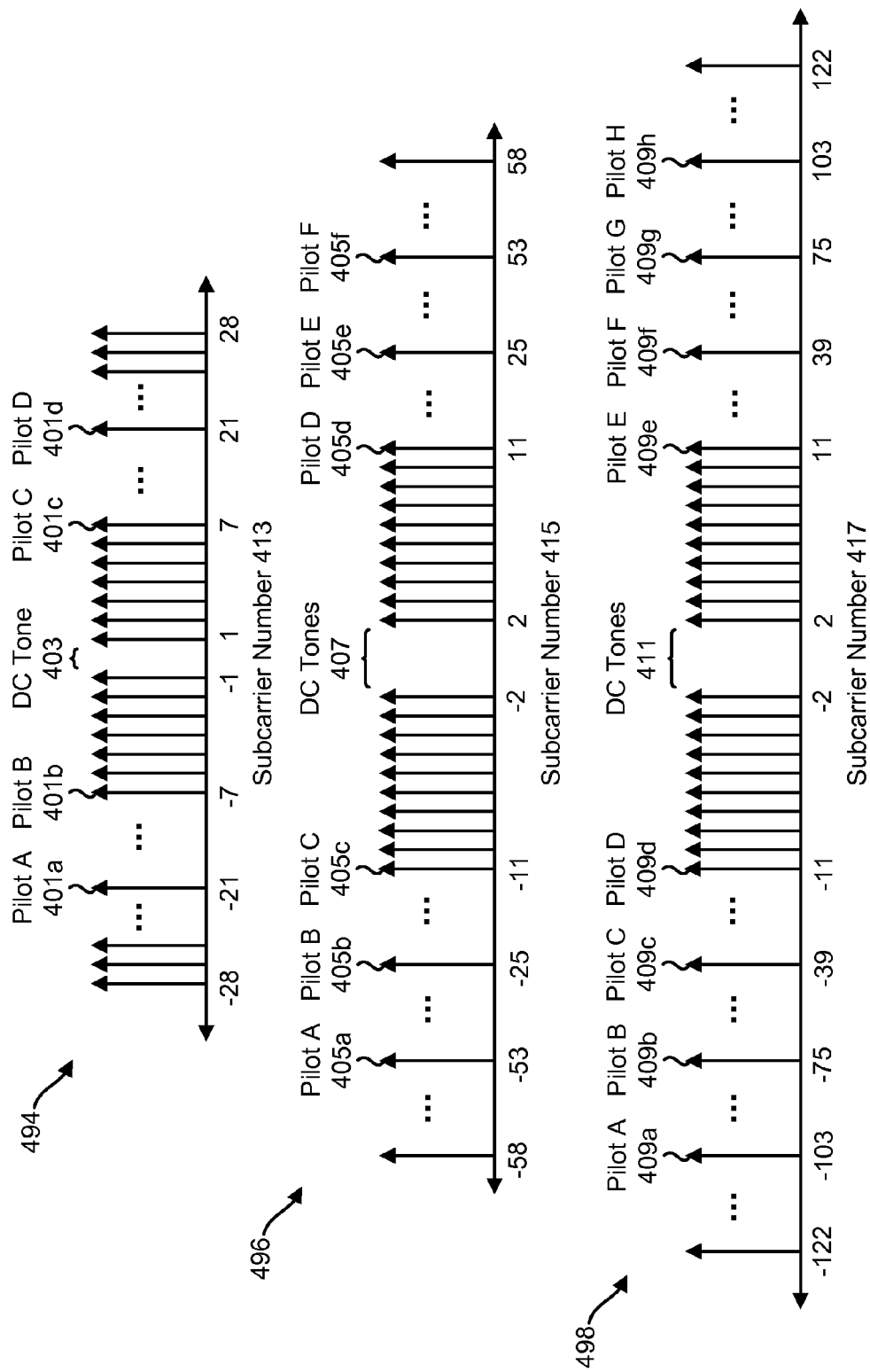
FIG. 4 is a diagram illustrating one example of data and pilot tones for an 80 megahertz (MHz) signal for a Very High Throughput Signal Field B (VHT-SIG-B) in accordance with the systems and methods disclosed herein.

FIG. 4 is a diagram illustrating one example of data and pilot tones for an 80 MHz signal 498 for a VHT-SIG-B in accordance with the systems and methods disclosed herein. Data and pilot tones for a 20 MHz signal 494 for a VHT-SIG-B and data and pilot tones for a 40 MHz signal 496 for a VHT-SIG-B are also illustrated. In accordance with the systems and methods disclosed herein, a number of data tones and pilot tones 409a-h for an 80 MHz 802.11ac signal 498 may be used for a VHT-SIG-B. This may be compared to the number of data tones and pilot tones 401a-d for a 20 MHz signal 494 for a VHT-SIG-B and the number of data tones and pilot tones 405a-f for a 40 MHz signal 496 for a VHT-SIG-B.

A 20 MHz signal 494 for a VHT-SIG-B uses 56 tones, including 52 data tones and four pilot tones 401a-d with one direct current (DC) tone 403. The data tones and pilot tones 401a-d may be located according to a subcarrier number or index 413. For example, pilot A 401a is located at −21, pilot B 401b is located at −7, pilot C 401c is located at 7 and pilot D 401d is located at 21. In this case, the single DC tone 403 is located at 0.

A 40 MHz signal 496 for a VHT-SIG-B uses 114 tones, including 108 data tones and six pilot tones 405a-f with three DC tones 407. The data tones and pilot tones 405a-f may be located according to a subcarrier number or index 415. For example, pilot A 405a is located at −53, pilot B 405b is located at −25, pilot C 405c is located at −11, pilot D 405d is located at 11, pilot E 405e is located at 25 and pilot F 405f is located at 53. In this case, three DC tones 407 are located at −1, 0 and 1.

An 80 MHz signal 498 for a VHT-SIG-B uses 242 tones, including 234 data tones and eight pilot tones 409a-h with three DC tones 411. The data tones and pilot tones 409a-h may be located according to a subcarrier number or index 417. For example, pilot A 409a is located at −103, pilot B 409b is located at −75, pilot C 409c is located at −39, pilot D 409d is located at −11, pilot E 409e is located at 11, pilot F 409f is located at 39, pilot G 409g is located at 75 and pilot H 409h is located at 103. In this case, three DC tones 411 are located at −1, 0 and 1. When a transmitting communication device 102 determines a channel bandwidth of 80 MHz, for example, it 102 may allocate subcarriers 160 for data tones and pilot tones 409a-h according to the signal 498 illustrated in FIG. 4. Additionally, when a receiving communication device 138 determines a channel bandwidth of 80 MHz, for instance, it 138 may receive subcarriers 160 for data and pilot tones 409a-h according to the signal 498 illustrated in FIG. 4.

It should be noted that when a 160 MHz signal is used, two copies of the 80 MHz signal 498 may be used (on two 80 MHz bands) in one configuration.

Figure 5:
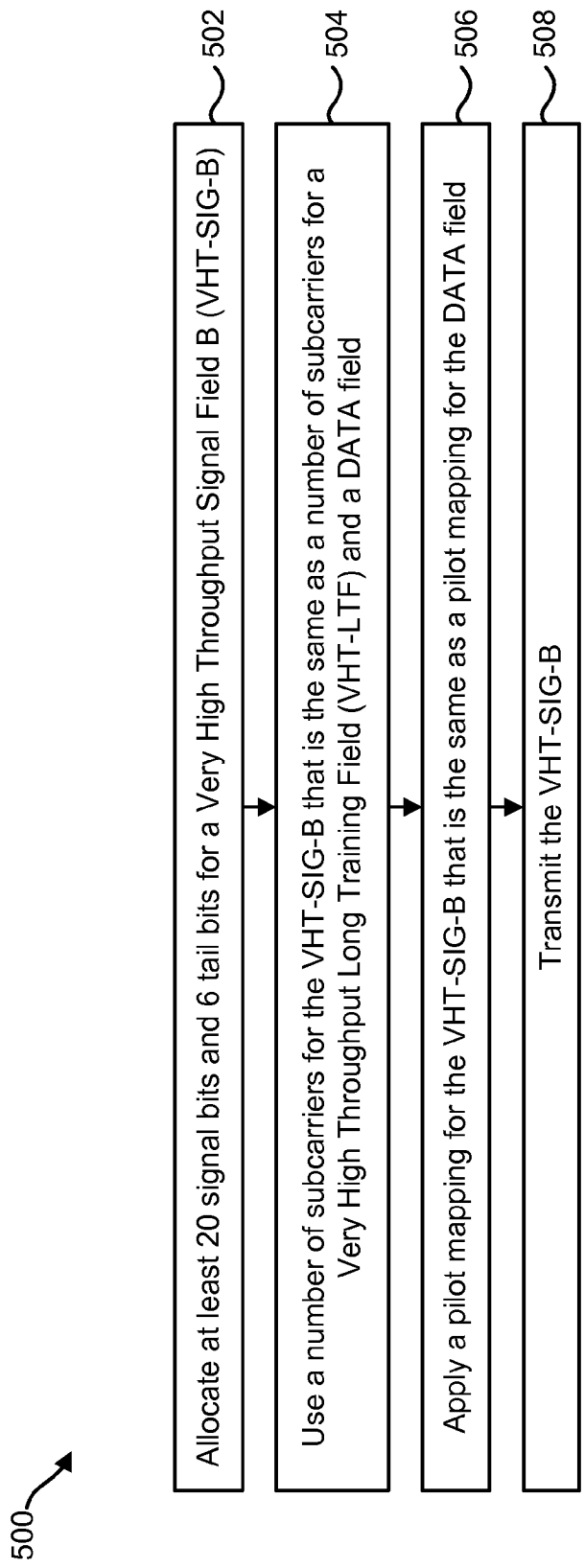
FIG. 5 is a flow diagram illustrating one configuration of a method for using a field format on a communication device.

FIG. 5 is a flow diagram illustrating one configuration of a method 500 for using a field format on a communication device. A communication device (e.g., a transmitting communication device 102) may allocate 502 at least twenty signal bits and six tail bits for a Very High Throughput Signal Field B (VHT-SIG-B).

For example, the VHT-SIG-B may include twenty signal bits 384a and six tail bits 386a for a 20 MHz transmission. In another example, the VHT-SIG-B may include twenty signal bits 384b, one reserved bit 388b and six tail bits 386b as well as one set of repeated bits 390 for a 40 MHz transmission. In this case, the set of repeated bits 390 may include twenty signal bits 384c, one reserved bit 388c and six tail bits 386c.

In yet another example, the VHT-SIG-B may include twenty signal bits 384d, three reserved bits 388d and six tail bits 386d as well as three sets of repeated bits 392a-c for an 80 MHz transmission. In this case, repeated bits A 392a may include twenty signal bits 384e, three reserved bits 388e and six tail bits 386e. Furthermore, repeated bits B 392b may include twenty signal bits 384f, three reserved bits 388f and six tail bits 386f. Additionally, repeated bits C 392c may include twenty signal bits 384g, three reserved bits 388g and six tail bits 386g. In one configuration, the bits used for an 80 MHz transmission may be repeated for a 160 MHz transmission (resulting in two sets of bits as described for the 80 MHz transmission). In another configuration, a separate format may be used for a 160 MHz transmission (if a separate 160 MHz interleaver 110 is used, for example).

The communication device (e.g., transmitting communication device 102) may use 504 a number of subcarriers 160 for the VHT-SIG-B that is the same as a number of subcarriers 160 for a Very High Throughput Long Training Field (VHT-LTF) and a DATA field. For a 20 MHz transmission, for example, the communication device may allocate 56 subcarriers 160 (e.g., OFDM tones) for a VHT-SIG-B, while 56 subcarriers 160 may be allocated for a VHT-LTF and while 56 subcarriers 160 may be allocated for a DATA field. For a 40 MHz transmission, for example, the communication device may allocate 114 subcarriers 160 (e.g., OFDM tones) for a VHT-SIG-B, while 114 subcarriers 160 may be allocated for a VHT-LTF and while 114 subcarriers 160 may be allocated for a DATA field. For an 80 MHz transmission, for example, the communication device may allocate 242 subcarriers 160 (e.g., OFDM tones) for a VHT-SIG-B, while 242 subcarriers 160 may be allocated for a VHT-LTF and while 242 subcarriers 160 may be allocated for a DATA field. For a 160 MHz transmission, for example, the communication device may allocate 484 subcarriers 160 (e.g., OFDM tones) for a VHT-SIG-B, while 484 subcarriers 160 may be allocated for a VHT-LTF and while 484 subcarriers 160 may be allocated for a DATA field.

The communication device (e.g., transmitting communication device 102) may apply 506 a pilot mapping (e.g., map 116) for the VHT-SIG-B that is the same as a pilot mapping for a DATA field. For a 20 MHz transmission, for example, the communication device may insert pilot symbols into subcarriers 160 at subcarrier index numbers −21, −7, 7, 21 for the VHT-SIG-B and for the DATA field. This may be done as illustrated in Equation (1) above. In this case, n=0 and z=3 for the VHT-SIG-B.

For a 40 MHz transmission, for example, the communication device may insert pilot symbols into subcarriers 160 at subcarrier index numbers −53, −25, −11, 11, 25, 53 for the VHT-SIG-B and for the DATA field. This may be done as illustrated in Equation (2) above. In this case, n=0 and z=3 for the VHT-SIG-B.

For an 80 MHz transmission, for example, the communication device may insert pilot symbols into subcarriers 160 at subcarrier index numbers −103, −75, −39, −11, 11, 39, 75, 103 for the VHT-SIG-B and for the DATA field. This may be done as illustrated in Equation (3) above. In this case, n=0 and z=3 for the VHT-SIG-B. For a 160 MHz transmission, the communication device may use two copies of an 80 MHz signal in one configuration. Thus, the pilot mapping for the 160 MHz signal may be similar to that described for the 80 MHz signal for each copy.

The communication device (e.g., transmitting communication device 102) may transmit 508 the VHT-SIG-B. For example, the transmitting communication device 102 may transmit the VHT-SIG-B to the receiving communication device 138 using one or more antennas 136*a-n*.

Figure 6:
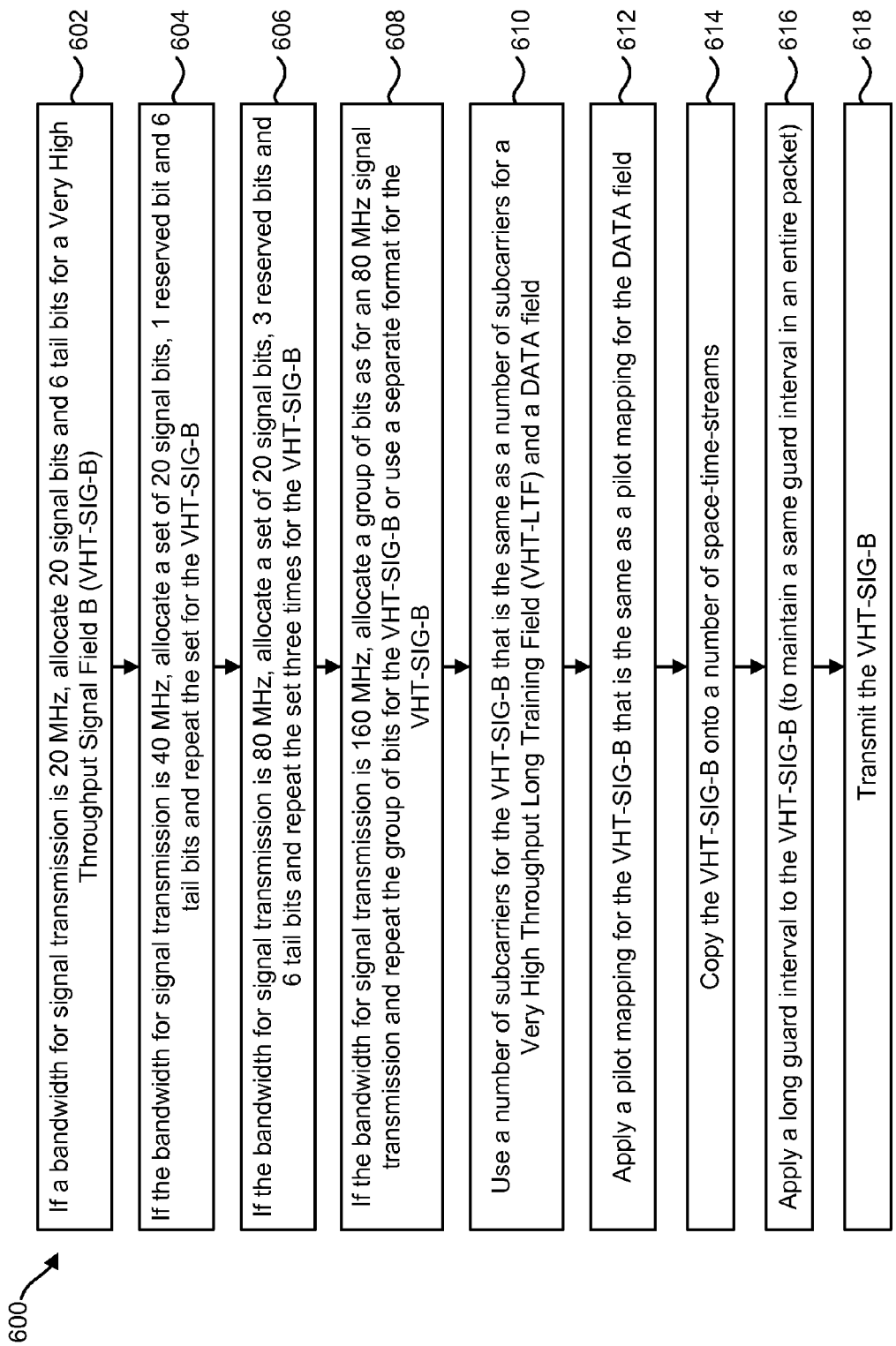
FIG. 6 is a flow diagram illustrating a more specific configuration of a method for using a field format on a communication device.

FIG. 6 is a flow diagram illustrating a more specific configuration of a method 600 for using a field format on a communication device. As described above, a communication device (e.g., transmitting communication device 102) may determine a bandwidth for signal transmission. If a bandwidth for signal transmission is 20 MHz, the communication device may allocate 602 twenty signal bits and six tail bits for a Very High Throughput Signal Field B (VHT-SIG-B). If the bandwidth for signal transmission is 40 MHz, the communication device may allocate 604 a set of twenty signal bits, one reserved bit and six tail bits and repeat the set for the VHT-SIG-B (resulting in two sets or copies). If the bandwidth for signal transmission is 80 MHz, the communication device may allocate 606 a set of twenty signal bits, three reserved bits and six tail bits and repeat the set three times for the VHT-SIG-B (resulting in four sets or copies).

If the bandwidth for signal transmission is 160 MHz, the communication device may allocate 608 a group of bits as for an 80 MHz signal transmission (e.g., four sets or copies of twenty signal bits, three reserved bits and six tail bits) and repeat the group of bits for the VHT-SIG-B (resulting in eight sets or copies). Alternatively, if the bandwidth for signal transmission is 160 MHz, the communication device may use a separate format for the VHT-SIG-B (if a separate 160 MHz interleaver 110 is used, for example). Repeating bits may provide additional bits for bandwidth (e.g., greater than twenty reserved bits). This may also provide a way for a receiver (e.g., receiving communication device 138) to get processing gain by averaging repeated soft values at the decoder input.

The communication device (e.g., transmitting communication device 102) may use 610 a number of subcarriers 160 for the VHT-SIG-B that is the same as a number of subcarriers 160 for a Very High Throughput Long Training Field (VHT-LTF) and a DATA field. For a 20 MHz transmission, for example, the communication device may allocate 56 subcarriers 160 (e.g., OFDM tones) for a VHT-SIG-B, while 56 subcarriers 160 may be allocated for a VHT-LTF and while 56 subcarriers 160 may be allocated for a DATA field. For a 40 MHz transmission, for example, the communication device may allocate 114 subcarriers 160 (e.g., OFDM tones) for a VHT-SIG-B, while 114 subcarriers 160 may be allocated for a VHT-LTF and while 114 subcarriers 160 may be allocated for a DATA field. For an 80 MHz transmission, for example, the communication device may allocate 242 subcarriers 160 (e.g., OFDM tones) for a VHT-SIG-B, while 242 subcarriers 160 may be allocated for a VHT-LTF and while 242 subcarriers 160 may be allocated for a DATA field. For a 160 MHz transmission, for example, the communication device may allocate 484 subcarriers 160 (e.g., OFDM tones) for a VHT-SIG-B, while 484 subcarriers 160 may be allocated for a VHT-LTF and while 484 subcarriers 160 may be allocated for a DATA field.

It should be noted that in the VHT-SIG-B, the pilots and scaling may be done similarly to that for the DATA field. This may avoid issues with duplicating 802.11a tones (like the VHT-SIG-A, for example). However, power scaling may be different for the VHT-SIG-B than that for the VHT-SIG-A (similar to an 802.11n High Throughput (HT) duplicate, for example). Pilot mapping and pilot processing may be different than that for the VHT-SIG-A, since VHT-LTFs may have a different number of pilots and a different pilot mapping than the VHT-SIG-A.

The communication device (e.g., transmitting communication device 102) may apply 612 a pilot mapping (e.g., map 116) for the VHT-SIG-B that is the same as a pilot mapping for a DATA field. For a 20 MHz transmission, for example, the communication device may insert pilot symbols into subcarriers 160 at subcarrier index numbers −21, −7, 7, 21 for the VHT-SIG-B and for the DATA field. This may be done as illustrated in Equation (1) above. In this case, the symbol index n=0 and the pilot scrambling sequence z=3 for the VHT-SIG-B.

For a 40 MHz transmission, for example, the communication device may insert pilot symbols into subcarriers 160 at subcarrier index numbers −53, −25, −11, 11, 25, 53 for the VHT-SIG-B and for the DATA field. This may be done as illustrated in Equation (2) above. In this case, the symbol index n=0 and the pilot scrambling sequence z=3 for the VHT-SIG-B.

For an 80 MHz transmission, for example, the communication device may insert pilot symbols into subcarriers 160 at subcarrier index numbers −103, −75, −39, −11, 11, 39, 75, 103 for the VHT-SIG-B and for the DATA field. This may be done as illustrated in Equation (3) above. In this case, the symbol index n=0 and the pilot scrambling sequence z=3 for the VHT-SIG-B. For a 160 MHz transmission, the communication device may use two copies of an 80 MHz signal in one configuration. Thus, the pilot mapping for the 160 MHz signal may be similar to that described for the 80 MHz signal for each copy.

The communication device (e.g., transmitting communication device 102) may copy 614 the VHT-SIG-B onto a number of space-time streams (e.g., streams 158). For example, the VHT-SIG-B may be duplicated on space-time streams 158. In one configuration, the VHT-SIG-B may be encoded and interleaved as a single-spatial stream symbol. For instance, the VHT-SIG-B may be copied onto $N_{STS}$ streams 158, where $N_{STS}$ is a number of space-time streams 158 in the DATA field for an intended receiver, device or user (e.g., receiving communication device 138). The $N_{STS}$ space-time streams 158 for the VHT-SIG-B may use the same cyclic shift diversity (CSD) values as used in a DATA field. For example, the communication device may apply cyclic shift values to the $N_{STS}$ space-time-streams 158 for the VHT-SIG-B that are the same as cyclic shift values for the $N_{STS}$ space-time-streams 158 in the DATA field.

The communication device (e.g., transmitting communication device 102) may apply 616 a long guard interval to the VHT-SIG-B. This may be done, for example, in order to maintain a same guard interval in an entire preamble part of a packet or frame. For example, the transmitting communication device 102 may apply 616 the same guard interval to the VHT-SIG-B that is applied to other fields (e.g., VHT-LTFs) in the preamble of a packet or frame.

The communication device (e.g., transmitting communication device 102) may transmit 618 the VHT-SIG-B. For example, the transmitting communication device 102 may transmit 618 the VHT-SIG-B to the receiving communication device 138 using one or more antennas 136a-n.

Figure 7:
FIG. 7 is a flow diagram illustrating another configuration of a method for using a field format on a communication device.

FIG. 7 is a flow diagram illustrating another configuration of a method 700 for using a field format on a communication device. A communication device (e.g., receiving communication device 138) may receive 702 a VHT-SIG-B on a number of space-time streams (e.g., streams 158). In one configuration, the communication device (e.g., receiving communication device 138) may obtain an $N_{STS}$-stream 158 channel estimate, where $N_{STS}$ is a number of space-time streams 158 for one particular receiver, device or user (e.g., receiving communication device 138).

The VHT-SIG-B received by the communication device (e.g., receiving communication device 138) may have the same format as described above based on the transmission bandwidth. For example, if a bandwidth for signal transmission is 20 MHz, the VHT-SIG-B may comprise twenty signal bits and six tail bits. If the bandwidth for signal transmission is 40 MHz, the VHT-SIG-B may comprise a set of twenty signal bits, one reserved bit and six tail bits that is repeated once (resulting in two of the same set or two copies). If the bandwidth for signal transmission is 80 MHz, the VHT-SIG-B may comprise a set of twenty signal bits, three reserved bits and six tail bits that is repeated three times (resulting in four of the same set or four copies). If the bandwidth for signal transmission is 160 MHz, the VHT-SIG-B may comprise two groups of bits, where each is allocated according to the 80 MHz transmission bandwidth case (resulting in eight of the same set or eight copies, for example). Alternatively, a separate format may be used for a VHT-SIG-B in a 160 MHz transmission.

Additionally or alternatively, the VHT-SIG-B may have the same number of subcarriers 160 as are used for a VHT-LTF and a DATA field. For example, the VHT-SIG-B may have a number of subcarriers (e.g., tones) 160 as indicated in Table (1) above. Additionally or alternatively, the received VHT-SIG-B may have scaling that is similar to the scaling performed for the DATA field.

Additionally or alternatively, the VHT-SIG-B may have the same pilot mapping as the pilot mapping for the DATA field. For example, the pilot symbols may be inserted at subcarrier indices {−21, −7, 7, 21} if a 20 MHz bandwidth is used at subcarrier indices {−53, −25, −11, 11, 25, 53} if a 40 MHz bandwidth is used and/or at subcarrier indices {−103, −75, −39, −11, 11, 39, 75, 103} if an 80 MHz bandwidth is used. For a 160 MHz bandwidth, the indices used for an 80 MHz bandwidth may be used twice, for example.

Additionally or alternatively, the received VHT-SIG-B may be copied onto a number ($N_{STS}$) of space-time streams 158 that is the same as the number ($N_{STS}$) of space-time streams 158 in the DATA field for a particular communication device or user. Additionally or alternatively, the VHT-SIG-B may have the same cyclic shift values as are used for the DATA field. In some configurations, the received VHT-SIG-B may have a long guard interval. For example, the VHT-SIG-B may have the same guard interval that is used for other fields in the preamble of a packet.

The communication device (e.g., receiving communication device 138) may decode 704 the VHT-SIG-B. In one configuration, the communication device may decode 704 the VHT-SIG-B as follows. The communication device may add channel estimates for the number of streams 158 and perform single-stream detection. For instance, for each subcarrier 160 and each receive antenna 154a-n, the receiving communication device 138 may add channel estimates for all $N_{STS}$ streams 158. Single-stream detection may then be performed using this modified channel estimate.

In another configuration, the communication device (e.g., receiving communication device 138) may alternatively perform decoding as follows. For example, the receiving communication device 138 may perform Multiple Input and Multiple Output (MIMO) receive processing. The $N_{STS}$ streams 158 may then be averaged per subcarrier 160. Finally, single-stream deinterleaving and decoding may be performed by the receiving communication device 138.

The communication device (e.g., receiving communication device 138) may perform 706 an operation using a decoded VHT-SIG-B. For example, the VHT-SIG-B may include information that the communication device (e.g., receiving communication device 138) may use to demodulate and/or decode data. For instance, the VHT-SIG-B may include modulation and coding scheme (MCS) information. This may allow the receiving communication device 138 to demodulate and/or decode data from the transmitting communication device 102 in accordance with the MCS.

Figure 8:
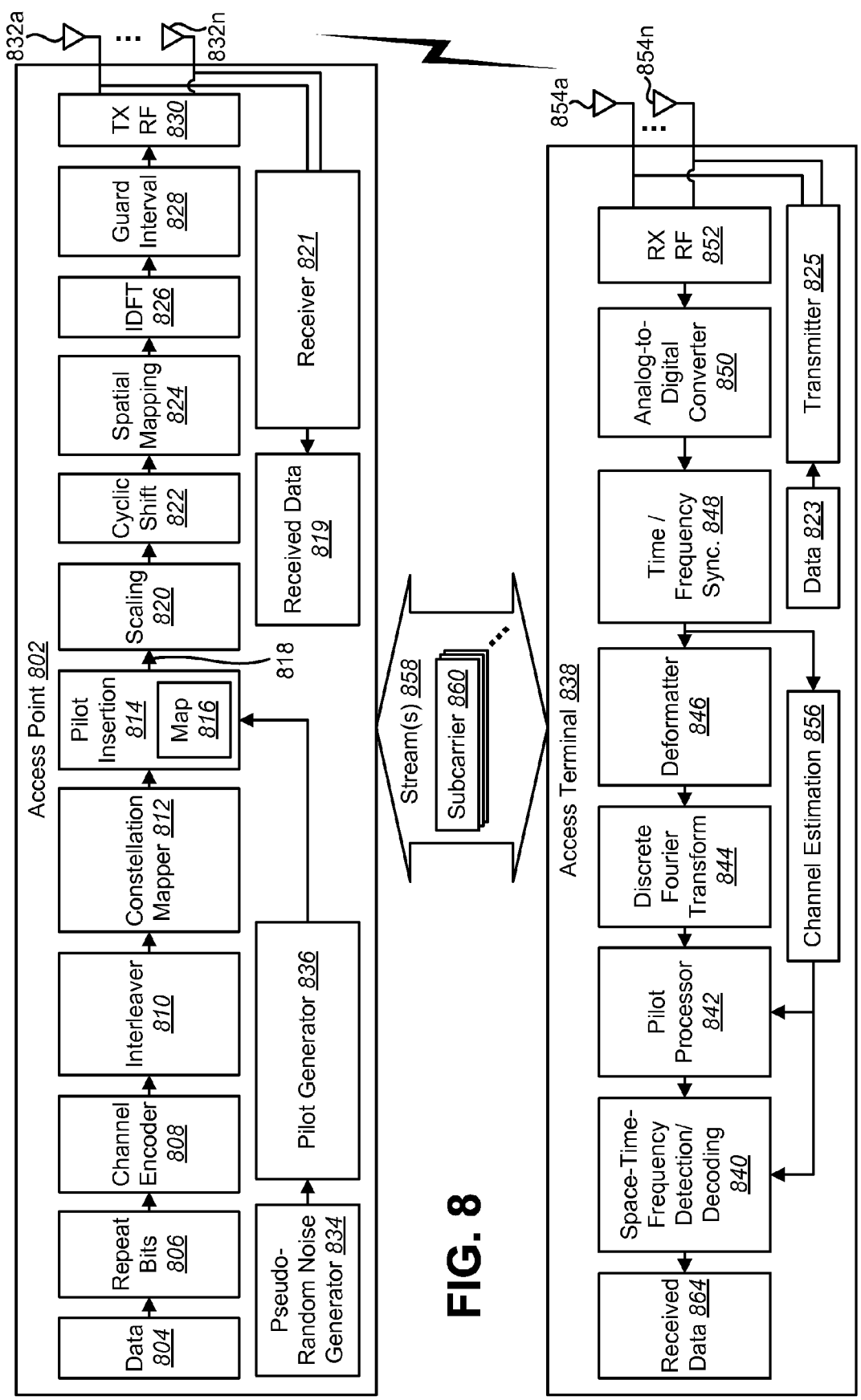
FIG. 8 is a block diagram illustrating one configuration of an access point and an access terminal in which systems and methods for using a field format may be implemented.

FIG. 8 is a block diagram illustrating one configuration of an access point 802 and an access terminal 838 in which systems and methods for using a field format may be implemented. The access point 802 may include a repeat bits block/module 806, a channel encoder 808, an interleaver 810, a constellation mapper 812, a pilot insertion block/module 814, a scaling block/module 820, a cyclic shift block/module 822, a spatial mapping block/module 824, an Inverse Discrete Fourier Transform (IDFT) block/module 826, a guard interval block/module 828, a transmission (TX) radio frequency (RF) block/module, one or more antennas 832a-n, a pseudorandom noise generator 834, a pilot generator 836 and/or a receiver 821.

It should be noted that one or more of the elements 806, 808, 810, 812, 814, 820, 822, 824, 826, 828, 830, 834, 836, 821 included in the access point 802 may be implemented in hardware, software or a combination of both. Furthermore, the term "block/module" may be used to indicate that a particular element may be implemented in hardware, software or a combination of both. It should also be noted that although some of the elements 806, 808, 810, 812, 814, 820, 822, 824, 826, 828, 830, 834, 836 may be illustrated as a single block, one or more of the elements 806, 808, 810, 812, 814, 820, 822, 824, 826, 828, 830, 834, 836 illustrated may comprise multiple parallel blocks/modules in some configurations. For instance, multiple channel encoders 808, multiple interleavers 810, multiple constellation mappers 812, multiple pilot insertion blocks/modules 814, multiple scaling blocks/modules 820, multiple cyclic shift blocks/modules 822, multiple spatial mapping blocks/modules 824, multiple IDFT blocks/modules 826, multiple guard interval blocks/modules 828 and/or multiple TX RF blocks/modules 830 may be used to form multiple paths in some configurations.

For instance, separate streams 858 (e.g., space-time streams 858, spatial streams 858, etc.) may be generated and/or transmitted using separate paths. In some implementations, these paths are implemented with distinct hardware, whereas in other implementations, the path hardware is reused for more than one stream 858 or the path logic is implemented in software that executes for one or more streams 858. More specifically, each of the elements illustrated in the access point 802 may be implemented as a single block/module or as multiple blocks/modules.

The data 804 may comprise overhead (e.g., control) data and/or payload data. For example, payload data may include voice, video, audio and/or other data. Overhead data may include control information, such as information that specifies a data rate, modulation and coding scheme (MCS), channel bandwidth, etc.

In some configurations or instances, the data 804 may be provided to the repeat bits block/module 806, which may repeat (e.g., generate copies of) bits from the data 804. For instance, if 40 MHz, 80 MHz or 160 MHz is used for a transmission bandwidth, then the repeat bits block/module 806 may repeat signal bits, tail bits and/or reserved bits for a Very High Throughput Signal Field B (VHT-SIG-B). For instance, if 40 MHz is used, then a set of twenty signal bits, one reserved bit and six tail bits may be allocated and may be repeated once, resulting in two copies or sets. If 80 MHz is used, then a set of twenty signal bits, three reserved bits and six tail bits may be allocated and may be repeated three times, resulting in four sets or copies. If 160 MHz is used, then a set of twenty signal bits, three reserved bits and six tail bits may be allocated and may be repeated three times (resulting in four sets or copies) to form a group of bits for an 80 MHz signal, which may then be repeated or copied, resulting in two groups. For example, two copied 80 MHz VHT-SIG-B data symbols may be used for 160 MHz. Or, eight sets or copies may be allocated for a 160 MHz signal. Alternatively, a separate or different format may be used for 160 MHz (if a separate 160 MHz interleaver 810 is used).

The (optionally repeated) data 804 may be provided to the channel encoder 808. The channel encoder 808 may encode data 804 for forward error correction (FEC), encryption, packeting and/or other encodings known for use with wireless transmission. For example, the channel encoder 808 may use binary convolutional coding (BCC).

The encoded data may be provided to the interleaver 810. The interleaver 810 may change bit ordering or interleave bits in order to more evenly spread channel errors over a sequence of bits. The interleaved bits may be provided to the constellation mapper 812. In some configurations, a separate interleaver 810 for 160 MHz signals may be provided.

The constellation mapper 812 maps the data provided by the interleaver 810 into constellation points (e.g., complex numbers). For instance, the constellation mapper 812 may use modulation schemes such as binary phase-shift keying (BPSK), quadrature amplitude modulation (QAM), etc. Where quadrature-amplitude modulation (QAM) is used, for example, the constellation mapper 812 might provide two bits per stream 858, per subcarrier 860, per symbol period. Furthermore, the constellation mapper 812 may output a 16-QAM constellation signal for each stream 858 for each data subcarrier 860 for each symbol period. Other modulations may be used, such as 64-QAM, which would result in a consumption of six bits per stream 858, per data subcarrier 860, per symbol period. Other variations are also possible. In one configuration, BPSK modulation may be used for the VHT-SIG-B. It should be noted that the constellation mapper 812 may allocate a number of subcarriers (e.g., OFDM tones) 860 and map the constellation points (e.g., symbols) to the subcarriers 860.

The pilot generator 836 may generate a pilot sequence. A pilot sequence may be a group of pilot symbols. In one configuration, for instance, the values in the pilot sequence may be represented by a signal with a particular phase, amplitude and/or frequency. For example, a "1" may denote a pilot symbol with a particular phase and/or amplitude, while a "−1" may denote a pilot symbol with a different (e.g., opposite or inverse) phase and/or amplitude.

The access point 802 may include a pseudo-random noise generator 834 in some configurations. The pseudo-random noise generator 834 may generate a pseudo-random noise sequence or signal (e.g., values) used to scramble the pilot sequence. For example, the pilot sequence for successive OFDM symbols may be multiplied by successive numbers from the pseudo-random noise sequence, thereby scrambling the pilot sequence per OFDM symbol. This may be done in accordance with the equation $p_{n+z}P_n^k$ where $p_n$ is the pseudo-random noise sequence, $P_n^k$ is the pilot sequence (or pilot mapping matrix), and k is an OFDM tone (e.g., subcarrier 860) index. In one configuration, n=0 and z=3 for the VHT-SIG-B. When the pilot sequence is sent to an access terminal 838, the received pilot sequence may be unscrambled by a pilot processor 842. It should be noted that the VHT-DATA symbol n=0 may be used for the VHT-SIG-B, meaning that the first DATA symbol and the VHT-SIG-B may both use DATA symbol number 0. It should also be noted that the pilot scrambling sequence z=3 may be used for the VHT-SIG-B.

The pilot insertion block/module 814 inserts pilot tones into pilot tone subcarriers 860. For example, the pilot sequence may be mapped to subcarriers 860 at particular indices according to a map 816. For instance, pilot symbols from the (scrambled) pilot sequence may be mapped to pilot subcarriers 860 that are interspersed with data subcarriers 860 and/or other subcarriers 860. In other words, the pilot sequence or signal may be combined with the data sequence or signal. In some configurations, one or more direct current (DC) tones may be centered at a subcarrier index 0.

The pilot mapping performed for a VHT-SIG-B by the pilot insertion block/module 814 may be the same as the pilot mapping performed for a DATA field in a packet or frame. As described above, the pilot symbols may be inserted at subcarrier indices {−21, −7, 7, 21} if a 20 MHz bandwidth is used. Additionally or alternatively, the pilot symbols may be inserted at subcarrier indices {−53, −25, −11, 11, 25, 53} if a 40 MHz bandwidth is used. Additionally or alternatively, the pilot symbols may be inserted at subcarrier indices {−103, −75, −39, −11, 11, 39, 75, 103} if an 80 MHz bandwidth is used. For a 160 MHz bandwidth, the indices used for an 80 MHz bandwidth may be used in two 80 MHz bandwidths, for example. In some configurations, the number of subcarriers used for the VHT-SIG-B may be the same as the number of subcarriers used for the VHT-LTF(s) and the DATA field(s). It should be noted that although examples of subcarrier or tone index numbers are given, other subcarrier or tone index numbers may be used.

The combined data and pilot signal 818 may be provided to a scaling block/module 820. The scaling block/module 820 may scale pilot symbols and/or data symbols. In some configurations, the scaling block/module 820 scales the pilot symbols and/or data symbols the same way as for a DATA field.

The scaled signal (e.g., the output signal from the scaling block/module 820) may be provided to the cyclic shift block/module 822. The cyclic shift block/module 822 may insert cyclic shifts to one or more spatial streams 858 or space-time streams 858 for cyclic shift diversity (CSD). In one configuration, the $N_{STS}$ space-time streams 858 for the VHT-SIG-B may use the same CSD values as are used for a DATA field.

In one configuration, the VHT-SIG-B may be encoded (by the channel encoder 808) and interleaved (by the interleaver 810) as a single-spatial-stream symbol. The constellation mapper 812 output (or the output of the pilot insertion block/module 814, the output of the scaling block/module 820 or the output of the cyclic shift block/module 822) of the VHT-SIG-B may be copied onto $N_{STS}$ streams 858, where $N_{STS}$ is a number of space-time streams 858 in a DATA field for an intended access terminal 838 or user. For example, the spatial mapping block/module 824 may map the VHT-SIG-B to $N_{STS}$ space-time streams 858 or spatial streams 858.

The IDFT block/module 826 may perform an inverse discrete Fourier transform on the signal provided by the spatial mapping block/module 824. For example, the inverse discrete Fourier transform (IDFT) block/module 826 converts the frequency signals of the data 804 and inserted pilot tones into time domain signals representing the signal over the streams 858 and/or time-domain samples for a symbol period. In one configuration, for example, the IDFT block/module 826 may perform a 256-point inverse fast Fourier transform (IFFT). In some configurations, the IDFT block/module 826 may additionally apply a phase rotation to one or more 20 MHz sub-bands.

The signal output from the IDFT block/module 826 may be provided to the guard interval block/module 828. The guard interval block/module 828 may insert (e.g., prepend) a guard interval to the signal output from the IDFT block/module 826. For example, the guard interval block/module 828 may insert a long guard interval that is the same length as a guard interval for other fields in a frame preamble. In some configurations, the guard interval block/module 828 may additionally perform windowing on the signal.

The output of the guard interval block/module 828 may be provided to the transmission (TX) radio frequency (RF) block/module 830. The TX RF block/module 830 may upconvert the output of the guard interval block/module 828 (e.g., a complex baseband waveform) and transmit the resulting signal using the one or more antennas 832a-n. For example, the one or more TX RF blocks/modules 830 may output radio-frequency (RF) signals to one or more antennas 832a-n, thereby transmitting the data 804 that was input to the channel encoder 808 over a wireless medium suitably configured for receipt by one or more access terminals 838.

It should be noted that the access point 802 may determine channel bandwidth to be used for transmissions to one or more access terminals 838. This determination may be based on one or more factors, such as access terminal 838 compatibility, number of access terminals 838 (to use the communication channel), channel quality (e.g., channel noise) and/or a received indicator, etc. In one configuration, the access point 802 may determine whether the bandwidth for signal transmission is 20 MHz, 40 MHz, 80 MHz or 160 MHz.

One or more of the elements 806, 808, 810, 812, 814, 820, 822, 824, 826, 828, 830, 834, 836 included in the access point 802 may operate based on the bandwidth determination. For example, the repeat bits block/module 806 may (or may not) repeat bits based on the bandwidth for signal transmission. Additionally, the pilot generator 836 may generate a number of pilot tones based on the bandwidth for signal transmission. For example, the pilot generator 836 may generate eight pilot symbols for an 80 MHz signal (with 242 OFDM tones: 234 data tones and eight pilot tones with three DC subcarriers 860).

Additionally, the constellation mapper 812 may map data 804 to a number of OFDM tones and the pilot insertion block/module 814 may insert pilot tones based on the bandwidth for signal transmission. In one example, if the current field is a VHT-SIG-B and the bandwidth used is 80 MHz, the constellation mapper 812 may map data 804 to 234 OFDM tones or subcarriers 860, leaving eight OFDM tones (e.g., subcarriers 860) for pilots and three subcarriers 860 as DC tones. In some configurations, the constellation mapper 812 may use a look-up table to determine the number of tones or subcarriers to use for a specified bandwidth.

Additionally, the pilot insertion block/module 814 may insert pilots based on the transmission bandwidth. For instance, an 80 MHz bandwidth may indicate that the pilot symbols should be inserted at indices −103, −75, −39, −11, 11, 39, 75 and 103. It should be noted that the IDFT block/module 826 may additionally rotate sub-bands (e.g., 20 MHz sub-bands) based on the bandwidth for signal transmission.

In one configuration, if the determined bandwidth is 20 MHz, the access point 802 may allocate 56 OFDM tones for the VHT-SIG-B field and/or 56 for the DATA field. If the bandwidth determined is 40 MHz, the access point 802 may allocate 114 OFDM tones for the VHT-SIG-B and/or 114 for the DATA field. If the bandwidth is 80 MHz, the access point 802 may allocate 242 OFDM tones for the VHT-SIG-B and/or 242 for the DATA field. If the bandwidth is 160 MHz, the access point 802 may allocate 484 OFDM tones for the VHT-SIG-B and/or 484 for the DATA field. Other numbers of OFDM tones may be used.

One or more streams 858 may be transmitted from the access point 802 such that the transmissions on different streams 858 may be differentiable at an access terminal 838 (with some probability). For example, bits mapped to one spatial dimension are transmitted as one stream 858. That stream 858 might be transmitted on its own antenna 832 spatially separate from other antennas 832, its own orthogonal superposition over a plurality of spatially-separated antennas 832, its own polarization, etc. Many techniques for stream 858 separation (involving separating antennas 832 in space or other techniques that would allow their signals to be distinguished at a receiver, for example) are known and can be used.

In the example shown in FIG. 8, there are one or more streams 858 that are transmitted using the same or a different number of antennas 832a-n (e.g., one or more). In some instances, only one stream 858 might be available because of inactivation of one or more other streams 858.

In the case that the access point 802 uses a plurality of frequency subcarriers 860, there are multiple values for the frequency dimension, such that the constellation mapper 812 might map some bits to one frequency subcarrier 860 and other bits to another frequency subcarrier 860. Other frequency subcarriers 860 may be reserved as guard bands, pilot tone subcarriers 860, or the like that do not (or do not always) carry data 804. For example, there may be one or more data subcarriers 860 and one or more pilot subcarriers 860. It should be noted that, in some instances or configurations, not all subcarriers 860 may be excited at once. For instance, some tones may not be excited to enable filtering. In one configuration, the access point 802 may utilize orthogonal frequency-division multiplexing (OFDM) for the transmission of multiple subcarriers 860. For instance, the constellation mapper 812 may map (encoded) data 804 to time and/or frequency resources according to the multiplexing scheme used.

The time dimension refers to symbol periods. Different bits may be allocated to different symbol periods. Where there are multiple streams 858, multiple subcarriers 860 and multiple symbol periods, the transmission for one symbol period might be referred to as an "OFDM (orthogonal frequency-division multiplexing) MIMO (multiple-input, multiple-output) symbol." A transmission rate for encoded data may be determined by multiplying the number of bits per simple symbol (e.g., $\log_2$ of the number of constellations used) times the number of streams 858 times the number of data subcarriers 860, divided by the length of the symbol period.

One or more access terminals 838 may receive and use signals from the access point 802. For example, an access terminal 838 may use a received bandwidth indicator to receive a given number of OFDM tones or subcarriers 860. Additionally or alternatively, an access terminal 838 may use a pilot sequence generated by the access point 802 to characterize the channel, transmitter impairments and/or receiver impairments and use that characterization to improve receipt of data 804 encoded in the transmissions.

For example, an access terminal 838 may include one or more antennas 854*a-n* (which may be greater than, less than or equal to the number of access point 802 antennas 832*a-n* and/or the number of streams 858) that feed to one or more receiver radio-frequency (RX RF) blocks/modules 852. The one or more RX RF blocks/modules 852 may output analog signals to one or more analog-to-digital converters (ADCs) 850. For example, a receiver radio-frequency block 852 may receive and downconvert a signal, which may be provided to an analog-to-digital converter 850. As with the access point 802, the number of streams 858 processed may or may not be equal to the number of antennas 854*a-n*. Furthermore, each spatial stream 858 need not be limited to one antenna 854, as various beamsteering, orthogonalization, etc. techniques may be used to arrive at a plurality of receiver streams.

The one or more analog-to-digital converters (ADCs) 850 may convert the received analog signal(s) to one or more digital signal(s). The output(s) of the one or more analog-to-digital converters (ADCs) 850 may be provided to one or more time and/or frequency synchronization blocks/modules 848. A time and/or frequency synchronization block/module 848 may (attempt to) synchronize or align the digital signal in time and/or frequency (to an access terminal 838 clock, for example).

The (synchronized) output of the time and/or frequency synchronization block(s)/module(s) 848 may be provided to one or more deformatters 846. For example, a deformatter 846 may receive an output of the time and/or frequency synchronization block(s)/module(s) 848, remove guard intervals, etc. and/or parallelize the data for discrete Fourier transform (DFT) processing.

One or more deformatter 846 outputs may be provided to one or more discrete Fourier transform (DFT) blocks/modules 844. The discrete Fourier transform (DFT) blocks/modules 844 may convert one or more signals from the time domain to the frequency domain. A pilot processor 842 may use the frequency domain signals (per spatial stream 858, for example) to determine one or more pilot tones (over the streams 858, frequency subcarriers 860 and/or groups of symbol periods, for example) sent by the access point 802. The pilot processor 842 may additionally or alternatively de-scramble the pilot sequence. The pilot processor 842 may use the one or more pilot sequences described herein for phase and/or frequency and/or amplitude tracking. The pilot tone(s) may be provided to a space-time-frequency detection and/or decoding block/module 840, which may detect and/or decode the data over the various dimensions. The space-time-frequency detection and/or decoding block/module 840 may output received data 864 (e.g., the access terminal's 838 estimation of the data 804 transmitted by the access point 802).

In some configurations, the access terminal 838 knows the transmit sequences sent as part of a total information sequence. The access terminal 838 may perform channel estimation with the aid of these known transmit sequences. To assist with pilot tone tracking, processing and/or data detection and decoding, a channel estimation block/module 856 may provide estimation signals to the pilot processor 842 and/or the space-time-frequency detection and/or decoding block/module 840 based on the output from the time and/or frequency synchronization block/module 848. Alternatively, if the de-formatting and discrete Fourier transform is the same for the known transmit sequences as for the payload data portion of the total information sequence, the estimation signals may be provided to the pilot processor 842 and/or the space-time-frequency detection and/or decoding block/module 840 based on the output from the discrete Fourier transform (DFT) blocks/modules 844.

The access terminal 838 may receive the VHT-SIG-B. When decoding the VHT-SIG-B, an $N_{STS}$-stream channel estimate may be available (e.g., provided by the channel estimation block/module 856), where $N_{STS}$ is a number of space-time streams 858 for one particular access terminal 838 or user. In one configuration, the space-time-frequency detection/decoding block/module 840 may function as follows. For each subcarrier 860 and each receive antenna 854*a-n*, the channel estimates for all $N_{STS}$ streams 858 may be added. The space-time-frequency detection/decoding block/module 840 may then perform a single-stream detection using this modified channel estimate. Alternatively, receiver decoding may be done as follows. The space-time-frequency detection/decoding block/module 840 may perform Multiple Input and Multiple Output (MIMO) receive processing. The $N_{STS}$ streams 858 may then be averaged per subcarrier 860. Finally, single-stream deinterleaving and decoding may be performed.

In some configurations, the access terminal 838 may determine a channel bandwidth (for received communications). For example, the access terminal 838 may receive a bandwidth indication from the access point 802 that indicates a channel bandwidth. For instance, the access terminal 838 may obtain an explicit or implicit bandwidth indication. In one configuration, the bandwidth indication may indicate a channel bandwidth of 20 MHz, 40 MHz, 80 MHz or 160 MHz. The access terminal 838 may determine the bandwidth for received communications based on this indication and provide an indication of the determined bandwidth to the pilot processor 842 and/or to the space-time-frequency detection/decoding block/module 840.

In some configurations, if the determined bandwidth is 20 MHz, the access terminal 838 may receive 56 OFDM tones for the VHT-SIG-B and/or 56 for the DATA field. If the bandwidth determined is 40 MHz, the access terminal 838 may receive 114 OFDM tones for the VHT-SIG-B field and/or 114 for the DATA field. If the bandwidth is 80 MHz, the access terminal 838 may receive 242 OFDM tones for the VHT-SIG-B field and/or 242 for the DATA field. If the bandwidth is 160 MHz, the access terminal 838 may receive 484 OFDM tones for the VHT-SIG-B and/or 484 for the DATA field. Other numbers of OFDM tones may be received.

The pilot processor 842 may use the determined bandwidth indication to extract pilot symbols from the discrete Fourier transform block/module 844 output. For example, if the access terminal 838 detects that the bandwidth is 80 MHz, the pilot processor 842 may extract pilot symbols from the indices $-103, -75, -39, -11, 11, 39, 75$ and $103$.

The space-time frequency detection/decoding block/module 840 may use the determined bandwidth indication to detect and/or decode data from the received signal. For example, if the current field is a VHT-SIG-B field and the determined bandwidth indication specifies that the bandwidth is 80 MHz, then the space-time frequency detection/decoding block/module 840 may detect and/or decode preamble data from 234 OFDM tones or subcarriers 860 (while eight OFDM tones are pilot tones and three subcarriers 860 are used for DC tones, for instance). In some configurations, the space-time-frequency detection/decoding block/module 840 may use a look-up table to determine the number of tones or subcarriers 860 to receive for a specified bandwidth.

In the configuration illustrated in FIG. 8, the access terminal 838 may include a transmitter 825. The transmitter 825 may perform similar operations as those performed by one or more of the elements 806, 808, 810, 812, 814, 820, 822, 824, 826, 828, 830, 834, 836 included in the access point 802 in order to transmit data 823 to the access point 802.

In the configuration illustrated in FIG. 8, the access point 802 may include a receiver 821. The receiver 821 may perform similar operations as those performed by one or more of the elements 840, 842, 844, 846, 848, 850, 852, 856 included in the access terminal 838 in order to obtain received data 819 from one or more access terminals 838. Thus, as illustrated in FIG. 8, bi-directional communications between the access point 802 and the access terminal 838 may occur on one or more streams 858 and on one or more subcarriers 860. In one configuration, the access terminal 838 may similarly format a VHT-SIG-B frame or packet as described in connection with the access point 802.

Figure 9:
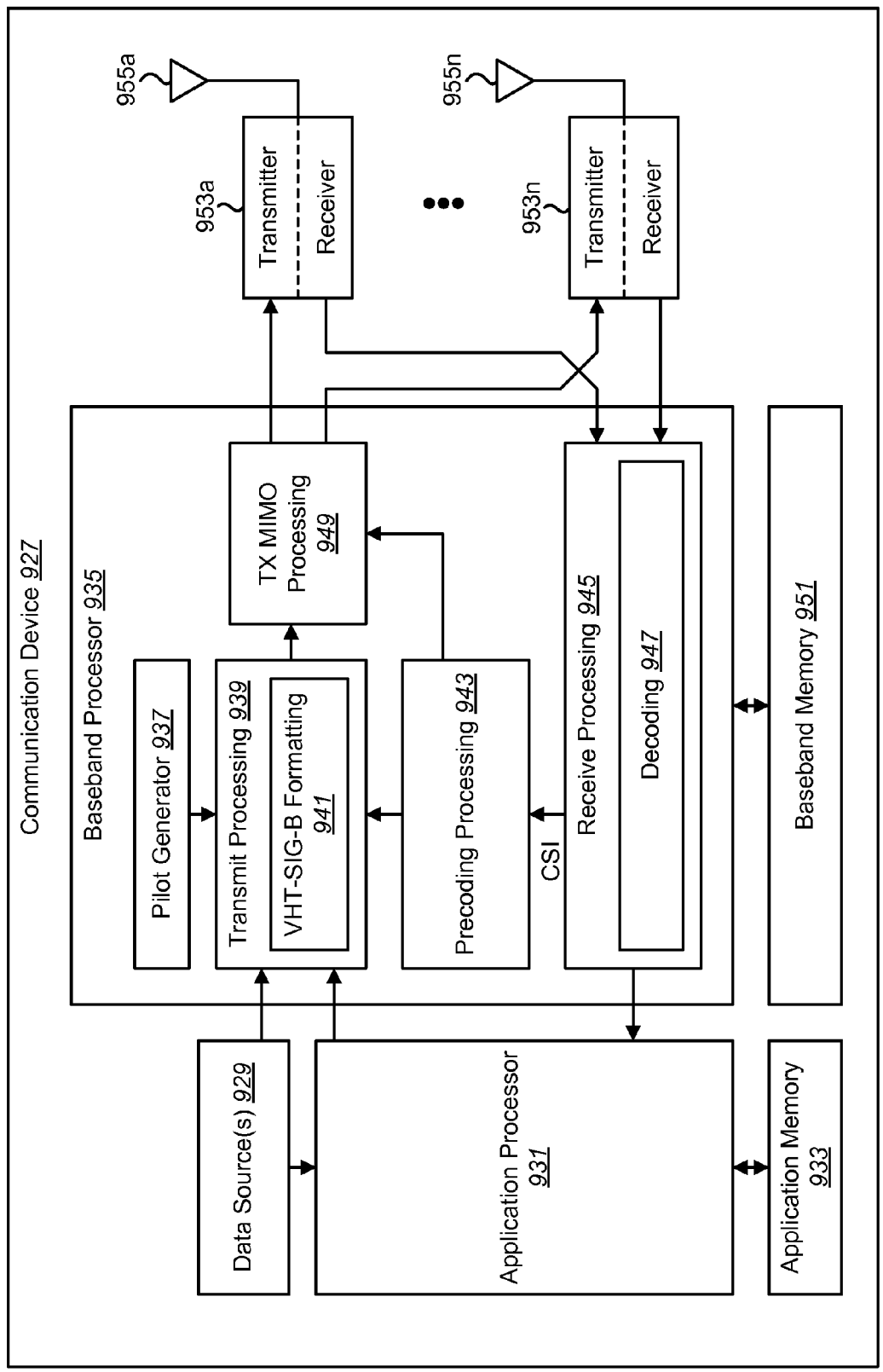
FIG. 9 is a block diagram of a communication device that may be used in a multiple-input and multiple-output (MIMO) system.

FIG. 9 is a block diagram of a communication device 927 that may be used in a multiple-input and multiple-output (MIMO) system. Examples of the communication device 927 may include transmitting communication devices 102, receiving communication devices 138, access points 802, access terminals 838, base stations, user equipment (UEs), etc. In the communication device 927, traffic data for a number of data streams is provided from one or more data sources 929 and/or an application processor 931 to a baseband processor 935. In particular, traffic data may be provided to a transmit processing block/module 939 included in the baseband processor 935. Each data stream may then be transmitted over a respective transmit antenna 955a-n. The transmit processing block/module 939 may format, code and interleave the traffic data for each data stream based on a particular coding scheme selected for that data stream to provide coded data.

The transmit processing block/module 939 may perform one or more of the methods 500, 600 illustrated in FIGS. 5 and 6. For example, the transmit processing block/module 939 may include a VHT-SIG-B formatting block/module 941. The VHT-SIG-B formatting block/module 941 may execute instructions in order to generate and/or format a VHT-SIG-B as described above.

The coded data for each data stream may be multiplexed with pilot data from a pilot generator 937 using orthogonal frequency-division multiplexing (OFDM) techniques. The pilot data may be a known data pattern that is processed in a known manner and used at a receiver to estimate the channel response. The multiplexed pilot and coded data for each stream is then modulated (i.e., symbol mapped) based on a particular modulation scheme (e.g., binary phase shift keying (BPSK), quadrature phase shift keying (QPSK), multiple phase shift keying (M-PSK), quadrature amplitude modulation (QAM) or multi-level quadrature amplitude modulation (M-QAM)) selected for that data stream to provide modulation symbols. The data rate, coding and modulation for each data stream may be determined by instructions performed by a processor (e.g., baseband processor 935, application processor 931, etc.).

The modulation symbols for all data streams may be provided to a transmit (TX) multiple-input multiple-output (MIMO) processing block/module 949, which may further process the modulation symbols (e.g., for OFDM). The transmit (TX) multiple-input multiple-output (MIMO) processing block/module 949 then provides a number of modulation symbol streams to the transmitters 953a-n. The transmit (TX) multiple-input multiple-output (MIMO) processing block/ module 949 may apply beamforming weights to the symbols of the data streams and to the antenna 955 from which the symbol is being transmitted.

Each transmitter 953 may receive and process a respective symbol stream to provide one or more analog signals, and further condition (e.g., amplify, filter, and upconvert) the analog signals to provide a modulated signal suitable for transmission over the MIMO channel. Modulated signals from the transmitters 953a-n are then respectively transmitted from the antennas 955a-n. For example, the modulated signal may be transmitted to another communication device (not illustrated in FIG. 9).

The communication device 927 may receive modulated signals (from another communication device). These modulated signals are received by antennas 955 and conditioned by receivers 953 (e.g., filtered, amplified, downconverted, digitized). In other words, each receiver 953 may condition (e.g., filter, amplify, and downconvert) a respective received signal, digitize the conditioned signal to provide samples, and further process the samples to provide a corresponding "received" symbol stream.

A receive processing block/module 945 included in the baseband processor 935 then receives and processes the received symbol streams from the receivers 953 based on a particular receiver processing technique to provide a number of "detected" streams. The receive processing block/module 945 demodulates, deinterleaves and decodes each stream to recover the traffic data for the data stream.

The receive processing block/module 945 may perform the method 700 illustrated in FIG. 7. For example, the receive processing block/module 945 may include a decoding block/ module 947. The decoding block/module 947 may execute instructions to decode a VHT-SIG-B.

A precoding processing block/module 943 included in the baseband processor 935 may receive channel state information (CSI) from the receive processing block/module 945. The precoding processing block/module 943 then determines which pre-coding matrix to use for determining the beamforming weights and then processes the extracted message. It should be noted that the baseband processor 935 may store information on and retrieve information from baseband memory 951.

The traffic data recovered by the baseband processor 935 may be provided to the application processor 931. The application processor 931 may store information in and retrieve information from the application memory 933.

Figure 10:
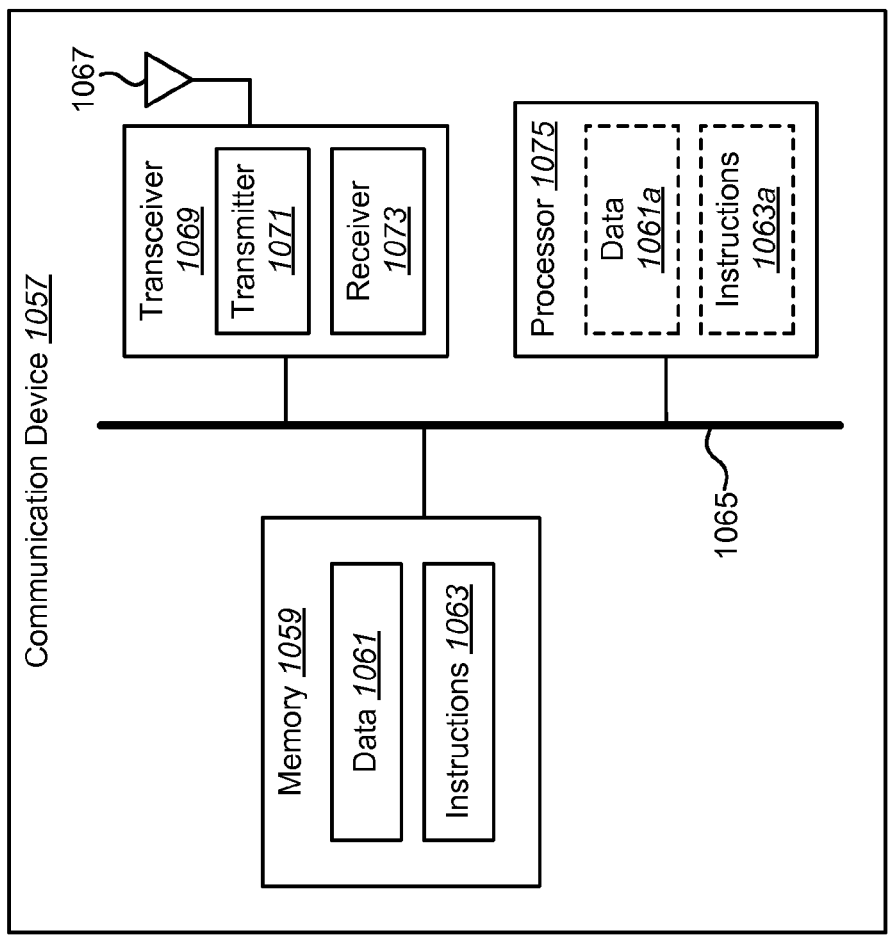
FIG. 10 illustrates certain components that may be included within a communication device.

FIG. 10 illustrates certain components that may be included within a communication device 1057. The transmitting communication device 102, receiving communication device 138, access point 802, access terminal 838 and/or communication device 927 described above may be configured similarly to the communication device 1057 that is shown in FIG. 10.

The communication device 1057 includes a processor 1075. The processor 1075 may be a general purpose single- or multi-chip microprocessor (e.g., an ARM), a special purpose microprocessor (e.g., a digital signal processor (DSP)), a microcontroller, a programmable gate array, etc. The processor 1075 may be referred to as a central processing unit (CPU). Although just a single processor 1075 is shown in the communication device 1057 of FIG. 10, in an alternative configuration, a combination of processors (e.g., an ARM and DSP) could be used.

The communication device 1057 also includes memory 1059 in electronic communication with the processor 1075 (i.e., the processor 1075 can read information from and/or write information to the memory 1059). The memory 1059 may be any electronic component capable of storing electronic information. The memory 1059 may be random access memory (RAM), read-only memory (ROM), magnetic disk storage media, optical storage media, flash memory devices in RAM, on-board memory included with the processor, programmable read-only memory (PROM), erasable programmable read-only memory (EPROM), electrically erasable PROM (EEPROM), registers, and so forth, including combinations thereof.

Data 1061 and instructions 1063 may be stored in the memory 1059. The instructions 1063 may include one or more programs, routines, sub-routines, functions, procedures, code, etc. The instructions 1063 may include a single computer-readable statement or many computer-readable statements. The instructions 1063 may be executable by the processor 1075 to implement one or more of the methods 500, 600, 700 described above. Executing the instructions 1063 may involve the use of the data 1061 that is stored in the memory 1059. FIG. 10 shows some instructions 1063a and data 1061a being loaded into the processor 1075.

The communication device 1057 may also include a transmitter 1071 and a receiver 1073 to allow transmission and reception of signals between the communication device 1057 and a remote location (e.g., another communication device, access terminal, access point, etc.). The transmitter 1071 and receiver 1073 may be collectively referred to as a transceiver 1069. An antenna 1067 may be electrically coupled to the transceiver 1069. The communication device 1057 may also include (not shown) multiple transmitters, multiple receivers, multiple transceivers and/or multiple antenna.

The various components of the communication device 1057 may be coupled together by one or more buses, which may include a power bus, a control signal bus, a status signal bus, a data bus, etc. For simplicity, the various buses are illustrated in FIG. 10 as a bus system 1065.

Figure 11:
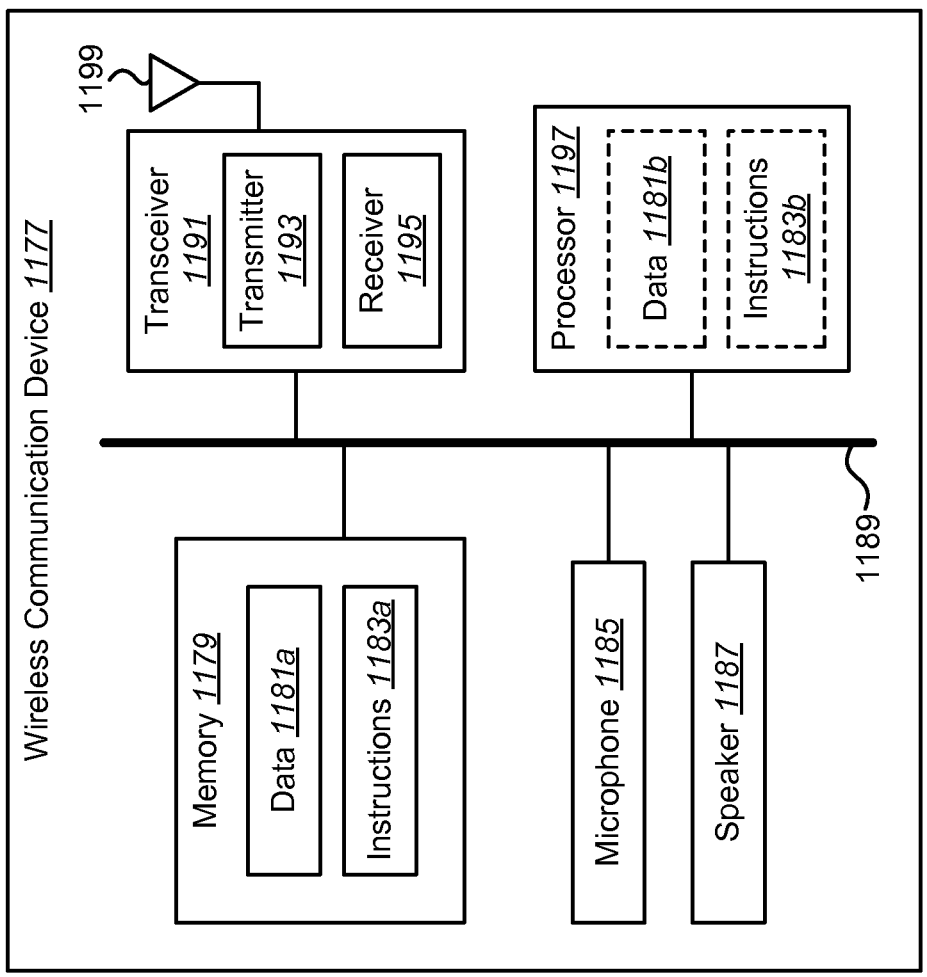
FIG. 11 illustrates certain components that may be included within a wireless communication device.

FIG. 11 illustrates certain components that may be included within a wireless communication device 1177. One or more of the transmitting communication device 102, receiving communication device 138, access terminal 838 and communication device 927 described above may be configured similarly to the wireless communication device 1177 that is shown in FIG. 11.

The wireless communication device 1177 includes a processor 1197. The processor 1197 may be a general purpose single- or multi-chip microprocessor (e.g., an ARM), a special purpose microprocessor (e.g., a digital signal processor (DSP)), a microcontroller, a programmable gate array, etc. The processor 1197 may be referred to as a central processing unit (CPU). Although just a single processor 1197 is shown in the wireless communication device 1177 of FIG. 11, in an alternative configuration, a combination of processors 1197 (e.g., an ARM and DSP) could be used.

The wireless communication device 1177 also includes memory 1179 in electronic communication with the processor 1197 (i.e., the processor 1197 can read information from and/or write information to the memory 1179). The memory 1179 may be any electronic component capable of storing electronic information. The memory 1179 may be random access memory (RAM), read-only memory (ROM), magnetic disk storage media, optical storage media, flash memory devices in RAM, on-board memory included with the processor 1197, programmable read-only memory (PROM), erasable programmable read-only memory (EPROM), electrically erasable PROM (EEPROM), registers, and so forth, including combinations thereof.

Data 1181a and instructions 1183a may be stored in the memory 1179. The instructions 1183a may include one or more programs, routines, sub-routines, functions, procedures, code, etc. The instructions 1183a may include a single computer-readable statement or many computer-readable statements. The instructions 1183a may be executable by the processor 1197 to implement one or more of the methods 500, 600, 700 described above. Executing the instructions 1183a may involve the use of the data 1181a that is stored in the memory 1179. FIG. 11 shows some instructions 1183b and data 1181b being loaded into the processor 1197 (which may come from instructions 1183a and data 1181a in memory 1179).

The wireless communication device 1177 may also include a transmitter 1193 and a receiver 1195 to allow transmission and reception of signals between the wireless communication device 1177 and a remote location (e.g., another electronic device, communication device, etc.). The transmitter 1193 and receiver 1195 may be collectively referred to as a transceiver 1191. An antenna 1199 may be electrically coupled to the transceiver 1191. The wireless communication device 1177 may also include (not shown) multiple transmitters 1193, multiple receivers 1195, multiple transceivers 1191 and/or multiple antenna 1199.

In some configurations, the wireless communication device 1177 may include one or more microphones 1185 for capturing acoustic signals. In one configuration, a microphone 1185 may be a transducer that converts acoustic signals (e.g., voice, speech) into electrical or electronic signals. Additionally or alternatively, the wireless communication device 1177 may include one or more speakers 1187. In one configuration, a speaker 1187 may be a transducer that converts electrical or electronic signals into acoustic signals.

The various components of the wireless communication device 1177 may be coupled together by one or more buses, which may include a power bus, a control signal bus, a status signal bus, a data bus, etc. For simplicity, the various buses are illustrated in FIG. 11 as a bus system 1189.

In the above description, reference numbers have sometimes been used in connection with various terms. Where a term is used in connection with a reference number, this may be meant to refer to a specific element that is shown in one or more of the Figures. Where a term is used without a reference number, this may be meant to refer generally to the term without limitation to any particular Figure.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The functions described herein may be stored as one or more instructions on a processor-readable or computer-readable medium. The term "computer-readable medium" refers to any available medium that can be accessed by a computer or processor. By way of example, and not limitation, such a medium may comprise RAM, ROM, EEPROM, flash memory, CD-ROM or other optical disk storage, magnetic disk storage or other magnetic storage devices, or any other medium that can be used to store desired program code in the form of instructions or data structures and that can be accessed by a computer or processor. Disk and disc, as used herein, includes compact disc (CD), laser disc, optical disc, digital versatile disc (DVD), floppy disk and Blu-ray® disc where disks usually reproduce data magnetically, while discs reproduce data optically with lasers. It should be noted that a computer-readable medium may be tangible and non-transitory. The term "computer-program product" refers to a computing device or processor in combination with code or instructions (e.g., a "program") that may be executed, processed or computed by the computing device or processor. As used herein, the term "code" may refer to software, instructions, code or data that is/are executable by a computing device or processor.

Software or instructions may also be transmitted over a transmission medium. For example, if the software is transmitted from a website, server, or other remote source using a coaxial cable, fiber optic cable, twisted pair, digital subscriber line (DSL) or wireless technologies such as infrared, radio and microwave, then the coaxial cable, fiber optic cable, twisted pair, DSL or wireless technologies such as infrared, radio and microwave are included in the definition of transmission medium.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

It is to be understood that the claims are not limited to the precise configuration and components illustrated above. Various modifications, changes and variations may be made in the arrangement, operation and details of the systems, methods, and apparatus described herein without departing from the scope of the claims.

What is claimed is:

1. A communication device for transmitting a Very High Throughput Signal Field B (VHT-SIG-B), comprising:
   a processor;
   memory in electronic communication with the processor;
   instructions stored in the memory, the instructions being executable to:
     allocate at least twenty signal bits and six tail bits for a VHT-SIG-B in a backwards compatible preamble;
     use a number of subcarriers for the VHT-SIG-B that is the same as a number of subcarriers for a Very High Throughput Long Training Field (VHT-LTF) and a DATA field;
     apply a pilot mapping for the VHT-SIG-B that is the same as a pilot mapping for the DATA field; and
     transmit the VHT-SIG-B.

2. The communication device of claim 1, wherein the instructions are further executable to allocate twenty signal bits and six tail bits for the VHT-SIG-B for a transmission bandwidth of 20 MHz.

3. The communication device of claim 1, wherein for a transmission bandwidth of 40 MHz, the instructions are further executable to:
   allocate a set of twenty signal bits, one reserved bit and six tail bits for the VHT-SIG-B; and
   repeat the set for the VHT-SIG-B.

4. The communication device of claim 1, wherein for a transmission bandwidth of 80 MHz, the instructions are further executable to:
   allocate a set of twenty signal bits, three reserved bits and six tail bits for the VHT-SIG-B; and
   repeat the set three times for the VHT-SIG-B.

5. The communication device of claim 1, wherein for a transmission bandwidth of 160 MHz, the instructions are further executable to:
   allocate a group of bits comprising four copies of a set of twenty signal bits, three reserved bits and six tail bits for the VHT-SIG-B; and
   repeat the group of bits for the VHT-SIG-B.

6. The communication device of claim 1, wherein the instructions are further executable to use a separate format for the VHT-SIG-B for a transmission bandwidth of 160 MHz.

7. The communication device of claim 1, wherein the instructions are further executable to copy the VHT-SIG-B onto a number of space-time streams that is the same as a number of space-time streams in the DATA field for another communication device.

8. The communication device of claim 1, wherein the instructions are further executable to apply a guard interval to the VHT-SIG-B that is the same as a guard interval in a packet.

9. The communication device of claim 1, wherein the communication device is one selected from a group consisting of an access point and an access terminal.

10. A communication device for receiving a Very High Throughput Signal Field B (VHT-SIG-B), comprising:
    a processor;
    memory in electronic communication with the processor;
    instructions stored in the memory, the instructions being executable to:
      receive a VHT-SIG-B on a number of space-time streams, wherein the VHT-SIG-B comprises at least twenty signal bits and six tail bits in a backwards compatible preamble, the VHT-SIG-B has a number of subcarriers that is the same as a number of subcarriers for a Very High Throughput Long Training Field (VHT-LTF) and a DATA field, and the VHT-SIG-B has a pilot mapping that is the same as a pilot mapping for the DATA field; and
      decode the VHT-SIG-B.

11. The communication device of claim 10, wherein the VHT-SIG-B comprises twenty signal bits and six tail bits for the VHT-SIG-B for a transmission bandwidth of 20 MHz.

12. The communication device of claim 10, wherein for a transmission bandwidth of 40 MHz, the VHT-SIG-B comprises two sets of twenty signal bits, one reserved bit and six tail bits.

13. The communication device of claim 10, wherein for a transmission bandwidth of 80 MHz, the VHT-SIG-B comprises four sets of twenty signal bits, three reserved bits and six tail bits.

14. The communication device of claim 10, wherein for a transmission bandwidth of 160 MHz, the VHT-SIG-B comprises two groups of bits, wherein each group of bits comprises four sets of twenty signal bits, three reserved bits and six tail bits.

15. The communication device of claim 10, wherein the VHT-SIG-B has a separate format for a transmission bandwidth of 160 MHz.

16. The communication device of claim 10, wherein the number of space-time streams is the same as a number of space-time streams in the DATA field.

17. The communication device of claim 10, wherein the VHT-SIG-B has a guard interval that is the same as a guard interval in a packet.

18. The communication device of claim 10, wherein decoding the VHT-SIG-B comprises:
    adding channel estimates for the number of space-time streams; and
    performing single-stream detection.

19. The communication device of claim 10, wherein decoding the VHT-SIG-B comprises:
performing Multiple Input and Multiple Output (MIMO) receive processing;
averaging the space-time streams; and
performing single-stream deinterleaving and decoding.

20. The communication device of claim 10, wherein the communication device is one selected from a group consisting of an access point and an access terminal.

21. A method for transmitting a Very High Throughput Signal Field B (VHT-SIG-B) by a communication device, comprising:
allocating at least twenty signal bits and six tail bits for a VHT-SIG-B in a backwards compatible preamble;
using a number of subcarriers for the VHT-SIG-B that is the same as a number of subcarriers for a Very High Throughput Long Training Field (VHT-LTF) and a DATA field;
applying a pilot mapping for the VHT-SIG-B that is the same as a pilot mapping for the DATA field; and
transmitting the VHT-SIG-B.

22. The method of claim 21, further comprising allocating twenty signal bits and six tail bits for the VHT-SIG-B for a transmission bandwidth of 20 MHz.

23. The method of claim 21, wherein for a transmission bandwidth of 40 MHz, the method further comprises:
allocating a set of twenty signal bits, one reserved bit and six tail bits for the VHT-SIG-B; and
repeating the set for the VHT-SIG-B.

24. The method of claim 21, wherein for a transmission bandwidth of 80 MHz, the method further comprises:
allocating a set of twenty signal bits, three reserved bits and six tail bits for the VHT-SIG-B; and
repeating the set three times for the VHT-SIG-B.

25. The method of claim 21, wherein for a transmission bandwidth of 160 MHz, the method further comprises:
allocating a group of bits comprising four copies of a set of twenty signal bits, three reserved bits and six tail bits for the VHT-SIG-B; and
repeating the group of bits for the VHT-SIG-B.

26. The method of claim 21, further comprising using a separate format for the VHT-SIG-B for a transmission bandwidth of 160 MHz.

27. The method of claim 21, further comprising copying the VHT-SIG-B onto a number of space-time streams that is the same as a number of space-time streams in the DATA field for another communication device.

28. The method of claim 21, further comprising applying a guard interval to the VHT-SIG-B that is the same as a guard interval in a packet.

29. The method of claim 21, wherein the communication device is one selected from a group consisting of an access point and an access terminal.

30. A method for receiving a Very High Throughput Signal Field B (VHT-SIG-B) by a communication device, comprising:
receiving a VHT-SIG-B on a number of space-time streams, wherein the VHT-SIG-B comprises at least twenty signal bits and six tail bits in a backwards compatible preamble, the VHT-SIG-B has a number of subcarriers that is the same as a number of subcarriers for a Very High Throughput Long Training Field (VHT-LTF) and a DATA field, and the VHT-SIG-B has a pilot mapping that is the same as a pilot mapping for the DATA field; and
decoding the VHT-SIG-B.

31. The method of claim 30, wherein the VHT-SIG-B comprises twenty signal bits and six tail bits for the VHT-SIG-B for a transmission bandwidth of 20 MHz.

32. The method of claim 30, wherein for a transmission bandwidth of 40 MHz, the VHT-SIG-B comprises two sets of twenty signal bits, one reserved bit and six tail bits.

33. The method of claim 30, wherein for a transmission bandwidth of 80 MHz, the VHT-SIG-B comprises four sets of twenty signal bits, three reserved bits and six tail bits.

34. The method of claim 30, wherein for a transmission bandwidth of 160 MHz, the VHT-SIG-B comprises two groups of bits, wherein each group of bits comprises four sets of twenty signal bits, three reserved bits and six tail bits.

35. The method of claim 30, wherein the VHT-SIG-B has a separate format for a transmission bandwidth of 160 MHz.

36. The method of claim 30, wherein the number of space-time streams is the same as a number of space-time streams in the DATA field.

37. The method of claim 30, wherein the VHT-SIG-B has a guard interval that is the same as a guard interval in a packet.

38. The method of claim 30, wherein decoding the VHT-SIG-B comprises:
adding channel estimates for the number of space-time streams; and
performing single-stream detection.

39. The method of claim 30, wherein decoding the VHT-SIG-B comprises:
performing Multiple Input and Multiple Output (MIMO) receive processing;
averaging the space-time streams; and
performing single-stream deinterleaving and decoding.

40. The method of claim 30, wherein the communication device is one selected from a group consisting of an access point and an access terminal.

41. A computer-program product for transmitting a Very High Throughput Signal Field B (VHT-SIG-B), comprising a non-transitory tangible computer-readable medium having instructions thereon, the instructions comprising:
code for causing a communication device to allocate at least twenty signal bits and six tail bits for a VHT-SIG-B in a backwards compatible preamble;
code for causing the communication device to use a number of subcarriers for the VHT-SIG-B that is the same as a number of subcarriers for a Very High Throughput Long Training Field (VHT-LTF) and a DATA field;
code for causing the communication device to apply a pilot mapping for the VHT-SIG-B that is the same as a pilot mapping for the DATA field; and
code for causing the communication device to transmit the VHT-SIG-B.

42. The computer-program product of claim 41, the instructions further comprising code for causing the communication device to copy the VHT-SIG-B onto a number of space-time streams that is the same as a number of space-time streams in the DATA field for another communication device.

43. A computer-program product for receiving a Very High Throughput Signal Field B (VHT-SIG-B), comprising a non-transitory tangible computer-readable medium having instructions thereon, the instructions comprising:
code for causing a communication device to receive a VHT-SIG-B on a number of space-time streams, wherein the VHT-SIG-B comprises at least twenty signal bits and six tail bits in a backwards compatible preamble, the VHT-SIG-B has a number of subcarriers that is the same as a number of subcarriers for a Very High Throughput Long Training Field (VHT-LTF) and a DATA field, and the VHT-SIG-B has a pilot mapping that is the same as a pilot mapping for the DATA field; and code for causing the communication device to decode the VHT-SIG-B.

44. The computer-program product of claim 43, wherein the number of space-time streams is the same as a number of space-time streams in the DATA field.

45. An apparatus for transmitting a Very High Throughput Signal Field B (VHT-SIG-B), comprising:

means for allocating at least twenty signal bits and six tail bits for a VHT-SIG-B in a backwards compatible preamble;

means for using a number of subcarriers for the VHT-SIG-B that is the same as a number of subcarriers for a Very High Throughput Long Training Field (VHT-LTF) and a DATA field;

means for applying a pilot mapping for the VHT-SIG-B that is the same as a pilot mapping for the DATA field; and means for transmitting the VHT-SIG-B.

46. The apparatus of claim 45, further comprising means for copying the VHT-SIG-B onto a number of space-time streams that is the same as a number of space-time streams in the DATA field for another apparatus.

47. An apparatus for receiving a Very High Throughput Signal Field B (VHT-SIG-B), comprising:

means for receiving a VHT-SIG-B on a number of space-time streams, wherein the VHT-SIG-B comprises at least twenty signal bits and six tail bits in a backwards compatible preamble, the VHT-SIG-B has a number of subcarriers that is the same as a number of subcarriers for a Very High Throughput Long Training Field (VHT-LTF) and a DATA field, and the VHT-SIG-B has a pilot mapping that is the same as a pilot mapping for the DATA field; and means for decoding the VHT-SIG-B.

48. The apparatus of claim 47, wherein the number of space-time streams is the same as a number of space-time streams in the DATA field.

* * * * *